(12) United States Patent
Piper et al.

(10) Patent No.: US 6,175,583 B1
(45) Date of Patent: Jan. 16, 2001

(54) METAL VAPOUR LASER

(75) Inventors: James Austin Piper, Pennant Hills; Robert John Carman, North Ryde; Michael John Withford, Ingleside; Daniel John Brown, Carlingford, all of (AU)

(73) Assignee: Macquarie Research LTD, New South Wales (AU)

( * ) Notice: Under 35 U.S.C. 154(b), the term of this patent shall be extended for 0 days.

(21) Appl. No.: 09/125,209

(22) PCT Filed: Feb. 17, 1997

(86) PCT No.: PCT/AU97/00083

§ 371 Date: Dec. 1, 1998

§ 102(e) Date: Dec. 1, 1998

(87) PCT Pub. No.: WO97/30496

PCT Pub. Date: Aug. 21, 1997

(30) Foreign Application Priority Data

Feb. 16, 1996 (AU) .................................................... PN8135

(51) Int. Cl.[7] ............................... H01S 3/22; H01S 3/223

(52) U.S. Cl. ................................. 372/56; 372/55; 372/56; 372/58; 372/60; 372/61

(58) Field of Search ................................ 372/55, 56, 58, 372/59, 60, 61

(56) References Cited

U.S. PATENT DOCUMENTS

| 4,905,248 | * | 2/1990 | Nishida ................................. 372/56 |
| 4,955,033 | * | 9/1990 | Maitland et al. .................... 372/56 |
| 5,077,749 | * | 12/1991 | Noda et al. .......................... 372/65 |
| 5,287,370 | * | 2/1994 | Maitland et al. .................... 372/35 |
| 5,504,770 | * | 4/1996 | Taylor et al. ........................ 372/56 |
| 5,544,191 | * | 8/1996 | Ohzu et al. .......................... 372/56 |
| 5,898,723 | * | 4/1999 | Guyadec et al. .................... 372/56 |

* cited by examiner

Primary Examiner—Frank G. Font
Assistant Examiner—Delma R. Flores Ruiz
(74) Attorney, Agent, or Firm—Jones, Tullar & Cooper PC

(57) ABSTRACT

There is disclosed a metal vapour laser comprising a discharge tube having a buffer gas therein and operating at high temperature, the buffer gas including a laser output power enhancing substance in an amount sufficient to substantially increase the power output of the laser. There is also disclosed a process for operating a metal vapour laser of the invention.

52 Claims, 18 Drawing Sheets

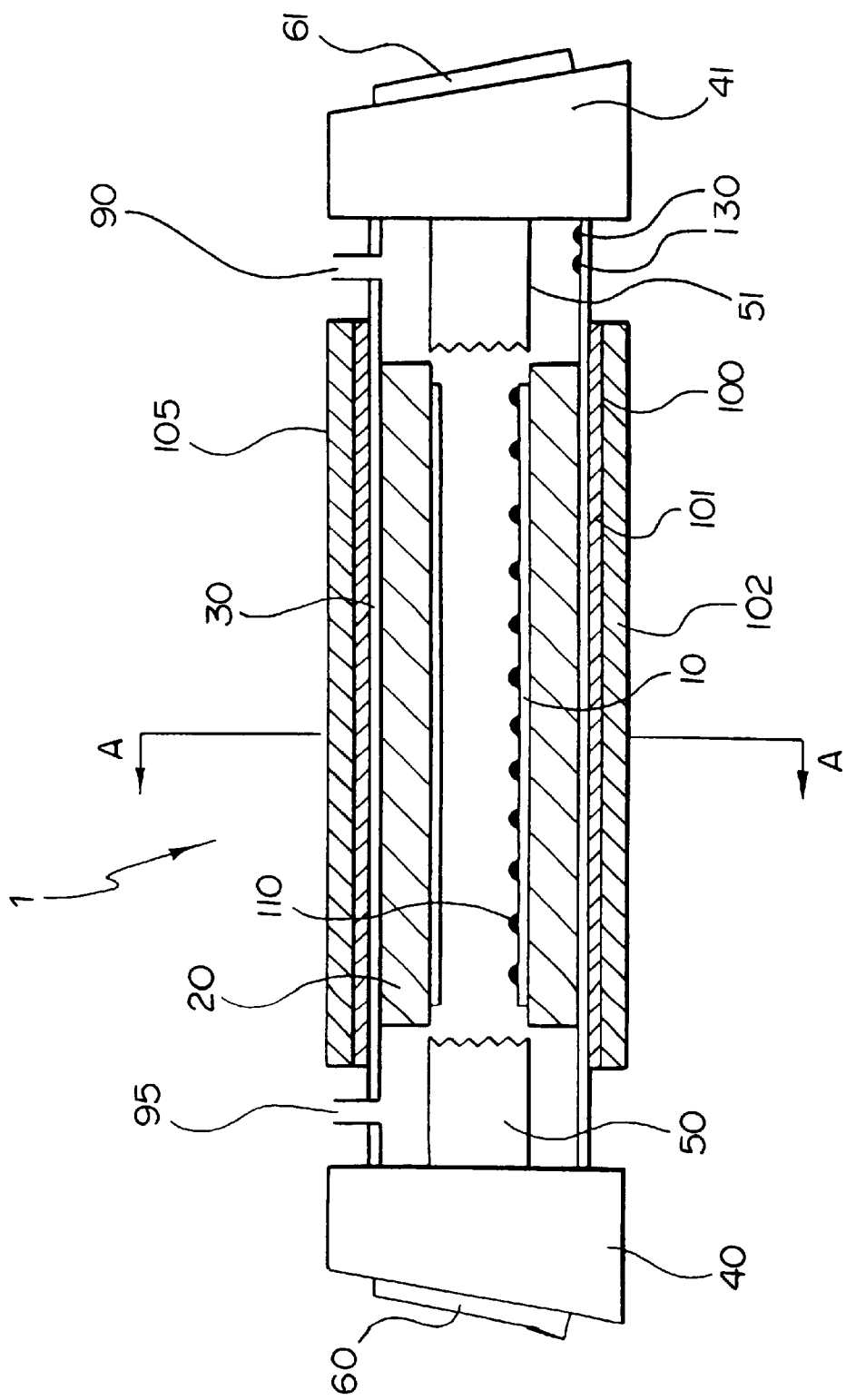
FIG. IA

METAL VAPOUR LASER

TECHNICAL FIELD

This invention relates to metal vapour lasers and to methods for operating metal vapour lasers.

BACKGROUND ART

Pulsed metal vapour lasers are a class of cyclic pulsed laser which generate high average power at high pulse repetition rates (kilohertz to tens of kilohertz) in the visible and infrared regions of the spectrum. They have been known since 1966 and are utilised commercially in a range of applications, particularly where relatively high power devices are required. Metal vapour lasers producing greater than 120 W are currently available. Such lasers find application in fields such as medicine, forensic science, machining, as pump sources for tunable dyes, and in isotope separation, for example in uranium enrichment.

The active region of a pulsed metal vapour laser is the discharge plasma tube, which is an extended tubular zone in which the metal vapour is confined and through which a pulsed high-current electrical gas discharge passes. The discharge plasma tube is normally formed from refractory ceramic material (usually recrystallized alumina) and surrounded by high-temperature insulation. The discharge plasma tube itself must be maintained at very high temperatures (for example 1400–1700° C. for a copper vapour laser) to ensure adequate vapour pressure (by way of thermal evaporation) of the metal, which is usually distributed along the tube. A buffer gas, usually He or Ne, is invariably present at a pressure of tens or hundreds of millibar to stabilise the metal vapour discharge.

Thus, in operation, metal vapour lasers typically include small pieces of the metal distributed in the plasma discharge tube, and, with the buffer gas flowing slowly through the tube, it is heated externally and/or by the discharge to a temperature such that the vapour pressure of metal in the buffer gas is sufficient to enable lasing to take place. For example, for a copper vapour laser the copper vapour density is typically about 1–10 Pa which requires a temperature of typically 1400–1700° C.

Although previously known metal vapour lasers are typically capable of operating at relatively high efficiencies (up to about 1%) and producing relatively high power output, there is a need for an improved metal vapour laser which provides higher output power than presently known metal vapour lasers, with at least comparable efficiencies, but which is relatively simple to use and is capable of stable operation. Desirably, such an improved metal vapour laser would be capable of operating with no flowing buffer gas.

OBJECTS OF THE INVENTION

It is an object of this invention to provide an improved metal vapour laser. It is a further object of this invention to provide an improved process for operating a metal vapour laser. In particular, it is an object of the present invention to provide a process for operating a metal vapour laser, by including in the laser one or more additives, to improve the output power and output beam characteristics of the laser in comparison to known high temperature metal vapour lasers.

SUMMARY OF THE INVENTION

According to a first form of the present invention, there is provided a metal vapour laser comprising a discharge tube having a buffer gas therein and operating at high temperature, the buffer gas including a laser output power enhancing substance in an amount sufficient to substantially increase the power output of the laser.

According to a second form of the present invention, there is provided a process for operating a metal vapour laser comprising a discharge tube having a buffer gas therein and operating at high temperature, utilising a buffer gas which includes a laser output power enhancing substance in an amount sufficient to substantially increase the power output of the laser. As described below, the buffer gas may have the laser output power enhancing substance premixed therewith, or the laser output power enhancing substance may be generated in the discharge tube under the opening conditions of the laser.

Thus, the second form of the invention provides a process for operating a metal vapour laser comprising a discharge tube having a buffer gas therein and operating at high temperature, comprising premixing a laser output power enhancing substance with the buffer gas or generating a laser output power enhancing substance in the discharge tube, the laser output power enhancing substance being present in the discharge tube at an operating condition of the laser in an amount sufficient to substantially increase the power output of the laser.

It is presently theorised by the inventors that the laser output power enhancing substance acts as an electron scavenger in the active region of the laser when the laser is in operation, though the inventors do not wish to be bound by this theory.

As used herein, the expression "an amount sufficient to substantially increase the power output" in connection with a laser or the operation of a laser, means an amount which, when included in the buffer gas of the operating laser, results in a substantial increase in the power output of the laser compared to the power output of the laser when it is operated under the same conditions in the absence of the laser output power enhancing substance.

Typically the metal vapour of the metal vapour laser of the present invention is a copper vapour, gold vapour, manganese vapour, cadmium vapour, zinc vapour, mercury vapour, tin vapour, magnesium vapour, barium vapour, chromium vapour, iron vapour, cobalt vapour, nickel vapour, silver vapour, gallium vapour, indium vapour, europium vapour, thallium vapour, bismuth vapour, antimony vapour, tellurium vapour, selenium vapour, strontium vapour, calcium vapour or a lead vapour.

More typically, the metal vapour is selected from copper vapour, gold vapour, manganese vapour, europium vapour, thallium vapour, barium vapour, iron vapour, bismuth vapour, strontium vapour, calcium vapour and lead vapour. Even more typically, the metal vapour is a copper vapour.

Generally, the operating temperature of the metal vapour laser is sufficient to provide a partial pressure of metal vapour in the laser tube of from about 13 Pa to about 130 Pa. For a copper vapour laser, for example, the operating temperature is from about 1400–1700° C., usually from 1400–1600° C., while for a lead vapour laser it is from about 900–1100° C. and for a gold vapour laser it is from about 1550–1850° C. Operating temperatures for other metal vapour lasers are known to persons skilled in the relevant art.

Typically, the laser output power enhancing substance is a species comprising one or more atoms selected from oxygen, sulfur, fluorine, chlorine, bromine and iodine. For example, the laser output power enhancing substance may be fluorine; chlorine; bromine; iodine; a hydrogen halide such as HF, HCl, HBr or HI; $H_2O$; $H_2S$; $SF_6$; $BF_3$; oxygen; sulfur; a halogenated hydrocarbon such as methyl chloride, methyl bromide, dichloromethane, trichloromethane, tetrachloromethane, trichloroethane, trichloroethene, tetrachloroethane, tetrachloroethene or any of the "freons"; a mixture of two or more of the foregoing; or a species derived from any of the foregoing under the operating conditions of the laser. Typically the laser output power enhancing substance is provided in a mixture of one or more of the foregoing with hydrogen and/or an additive such as a hydrogen source, or a species derived therefrom.

The buffer gas is typically an inert gas, such as krypton, xenon, argon, helium or neon or a mixture of two or more thereof, or a mixture of an inert gas with hydrogen or deuterium. More typically, the buffer gas is selected from neon and helium.

The pressure of the buffer gas depends on which gas is selected as the inert gas. Usually, the pressure of the buffer gas in the operating laser ranges from 0.1 kPa to 20 kPa, more usually from 0.5 kPa to 15 kPa, or from 1.3 kPa to 13 kPa, or from 2 kPa to 10 kPa or from 3 kPa to 7 kPa, or from 5 kPa to 6 kPa. Even more usually the pressure of the buffer gas is about 5.2 kPa when the buffer gas is predominantly neon.

In a third form of the present invention there is provided a process for operating a metal vapour laser comprising a discharge tube having a buffer gas therein, the buffer gas including a laser output power enhancing substance in an amount sufficient to substantially increase the power output of the laser; comprising the step of adjusting the concentration of the laser output power enhancing substance by adding to the buffer gas an additive capable of controlling the concentration of the laser output power enhancing substance in the buffer gas.

In a fourth form of the present invention, there is provided a metal vapour laser comprising a discharge tube having a buffer gas therein, the buffer gas including a laser output power enhancing substance in an amount sufficient to substantially increase the power output of the laser, and means operatively associated with said discharge tube to add to the buffer gas an additive capable of controlling the concentration of the laser output power enhancing substance in the buffer gas.

Typically, the additive is hydrogen or an isotope thereof, such as $H_2$, $D_2$, $T_2$, HD, HT or DT, water (usually as a vapour), or a hydrocarbon, such as methane, ethane, ethene, ethyne, propane, propene, propyne, any of the isomeric butanes, butenes, butynes, pentanes, pentenes, pentynes or higher aliphatic hydrocarbons, or aromatic hydrocarbons such as benzene, tolune, a xylene or a higher homologue, or a mixture of any two or more of the foregoing, or deuterated forms of the foregoing. More typically, the additive is hydrogen or deuterium, still more typically hydrogen. Yet more typically, the laser output power enhancing substance is HBr, HCl, or a mixture of HCl and HBr, and the additive is hydrogen.

One way is which the concentration of laser output enhancing substance may be varied in a process according to the third form of the invention is to vary the concentration of additive added to the buffer gas. Alternatively, the concentration of the additive may be fixed and the concentration of the laser output power enhancing substance varied by varying the concentration of a precursor of the laser output power enhancing substance, as described in more detail herein below.

The amount of laser output power enhancing substance present in the buffer gas depends on the metal vapour of the laser but, given the teaching herein, may be determined by a person of ordinary skill in the art with no more than ordinary experimentation. When the metal vapour is a copper vapour, for instance, or the vapour of many of the other metals exemplified herein, the laser output power enhancing substance is generally present in an amount of from a trace to about 5% by volume of the buffer gas, usually from 0.1% to 5% by volume, more usually from 0.2% to 4% by volume, yet more usually from 0.25% to 3% by volume, still more usually from 0.3% to 2.5% by volume, and even more usually from 0.5 to 2% by volume. For example, the laser output power enhancing substance is typically present in the range of from 0.5–1, or 1–1.5, or 1.5–2, or 2–2.5, or 0.5–1.5, or 1–2, or 1.5–2.5 or 2–3, or 2.5–3.5% by volume.

The additive is generally present in an amount of from 0.1 to 5% by volume, more usually from 0.2% to 4% by volume, still more usually from 0.25% to 3% by volume, even more usually from 0.3% to 2.5 % by volume, yet more usually from 0.5 to 2% by volume. For example, the additive is typically present in the range of from 0.5–1, or 2.5% by volume, and even more usually from 0.5 to 2% by volume. For example, the laser output power enhancing substance is typically present in the range of from 0.5–1, or 1–1.5, or 1.5–2, or 2–2.5, or 0.5–1.5, or 1–2, or 1.5–2.5 or 2–3, or 2.5–3.5% by volume.

The additive is generally present in an amount of from 0.1 to 5% by volume, more usually from 0.2% to 4% by volume, still more usually from 0.25% to 3% by volume, even more usually from 0.3% to 2.5% by volume, yet more usually from 0.5 to 2% by volume. For example, the additive is typically present in the range of from 0.5–1, or 1–1.5, or 1.5–2, or 2–2.5, or 0.5–1.5, or 1–2, or 1.5–2.5 or 2–3, or 2.5–3.5% by volume. Even more typically the laser output power enhancing substance is HCl in an amount of from about 0.2% to 1% by volume of the buffer gas and the additive is hydrogen in an amount of from about 1% to 2% by volume of the buffer gas. Usually in these forms of the invention the partial pressure of the additive and/or the laser output power enhancing substance in the buffer gas is from about 1 Pa to about 2000 Pa, more usually from 2 Pa to 1500 Pa or 3 Pa to 1200 Pa or 4 Pa to 1000 Pa or 5 Pa to 950 Pa or 6 Pa to 900 Pa or 7 Pa to 850 Pa or 8 Pa to 800 Pa or 10 Pa to 750 Pa or 12 Pa to 700 Pa, even more usually about 13 Pa to about 665 Pa.

Without wishing to be bound by theory, the inventors speculate that when the laser output power enhancing substance is a halogen containing substance the additive acts by chemically reducing halogen containing species present in the discharge tube into hydrogenated species such as HCl and HBr which, in appropriate concentrations, are more effective that the unreduced halogen containing substance for increasing the power output of the laser.

The additive may be premixed with the buffer gas and admitted to the discharge tube, or it may be generated in situ in the discharge tube. Where the additive is a gas, it may be supplied from a pressurised source such as a gas cylinder and mixed in an appropriate amount with the buffer gas. Alternatively, the additive may be stored, for example, in an adsorbed or adsorbed form on a convenient adsorbent or adsorbent such as activated carbon, alumina, silica, zeolite or metal, such as palladium, or in the form of a chemical compound which is capable of decomposing or dissociating at an elevated temperature to regenerate the additive. In such situations, the additive is typically obtained by heating the adsorbent or chemical compound in an atmosphere or flowing stream of the buffer gas. The concentration of additive in the buffer gas may be adjusted by adjusting the heating temperature and/or the flow rate of the buffer gas. Similarly, if the additive is a liquid at ambient temperatures, a mixture of the vapour of the additive and the buffer gas may be obtained by flowing the buffer gas through the liquid or over its surface and the concentration of the additive in the buffer gas may be adjusted by controlling the temperature of the liquid and/or the flow rate of the buffer gas.

In yet a further alternative, the concentration of additive, when it is hydrogen or an isotope thereof, may be controlled by a "getter" in the plasma region as described in more detail hereinbelow.

Conveniently, when the additive is hydrogen or an isotope thereof, it may be added to the buffer gas directly as a gas or it may be stored in a "getter" as a metal hydride, deuteride, etc. and generated in situ or externally to the discharge tube. Suitable metals for forming metal hydrides which dissociate to regenerate hydrogen are known and include palladium, lanthanum, yttrium, erbium, cerium and other rare earth metals, uranium, scandium, vanadium, titanium, zirconium, tantalum, niobium, chromium, manganese, iron, cobalt, nickel, thorium, copper, magnesium and alloys of two or more thereof, such as "Mischmetal", "Mischmetal"-Ni, $LaNi_5$, $Mg_2Ni$, FeTi, Fe—Ti—Mn, Fe—Ti—Cr, Fe—Ti—Co, $AlTh_2$, $CaAg_2$, Ti—Mn, Ti—Cu, Ti—Ni, Zr—Ni, V—Nb, $Mg_2Cu$ and Zr—U.

When the additive is generated in situ in the discharge tube, this may be achieved by including in the discharge tube a quantity of the additive adsorbed or absorbed on an adsorbent or absorbent as described above or in the form of a chemical compound which is capable of decomposing or dissociating at an elevated temperature to regenerate the additive.

The laser output power enhancing substance may be introduced into the buffer gas in a variety of ways. For instance, it may be mixed with the buffer gas externally to the laser discharge tube, and the mixture then introduced into the tube.

As a further possibility, halogen or hydrogen halide may be pre-adsorbed or adsorbed onto a zeolite or other solid adsorbent or absorbent and the pretreated adsorbent or adsorbent included in the discharge tube. On heating the discharge tube, the adsorbed halogen and hydrogen halide is desorbed into the buffer gas in the discharge tube. The concentration of laser output power enhancing substance in the plasma region of the laser is then typically controlled by the inclusion of a suitable additive such as hydrogen in the buffer gas.

As yet a further possibility, the laser output power enhancing substance or its precursor may be a substance which is a solid which vaporizes and/or dissociates under the operating conditions of the laser, and which is included in the discharge tube as a solid when the discharge tube is cold. Examples of such substances include ammonium halides and hydrohalide salts of organic amines.

In another embodiment of the invention, the laser output power enhancing substance is generated in situ. In one form of this embodiment, a substance is included in the buffer gas in contact with the interior of the discharge tube for a pre-conditioning period prior to initiating a discharge in the buffer gas, the substance being capable of reacting with or being adsorbed or adsorbed on the surface of the laser discharge tube. The substance may be any of the substances exemplified hereinbefore as laser output power enhancing substances or substances from which a laser output power enhancing substance is derived under the operating conditions of the laser (herein termed a "precursor of a laser output power enhancing agent"), or it may be a substance which reacts with the material from which the discharge tube is constructed so as to produce a laser output power enhancing substance of a precursor of a laser output power enhancing substance. In this embodiment, after the pre-conditioning period buffer gas admitted to the discharge tube usually includes no laser output power enhancing substance or precursor of a laser output power enhancing substance. For example, when the discharge tube is alumina and the precursor of the laser output power enhancing substance includes hydrogen halide or halogen, it is believed that aluminum halide is formed in the discharge tube during the pre-conditioning, and dissociates during the high temperature operation of the laser. By varying the reservoir of an additive such as hydrogen or an isotope thereof in the discharge tube, the rate at which hydrogen halide is produced can be affected. Thus, typically no further hydrogen halide or halogen is required to be included in buffer gas admitted to the discharge tube after the pre-conditioning period.

In a variation of this embodiment of the invention, the laser discharge tube includes a metal halide in a quantity sufficient to substantially increase the output power of the laser at the operating temperature of the laser. That is, the laser output power enhancing substance is derived from the metal halide under the operating conditions of the laser. It will be appreciated that in this variation, it is not necessary to pre-condition the laser before use.

For example, the laser may be provided with an amount of one or more metal halides in the discharge tube. Typically, in this form of the invention a concentration of hydrogen, or a mixture of hydrogen with a hydrogen halide, is included in the flowing buffer gas as described above. Usually a metal halide which is utilised in such an embodiment of the invention is a fluoride, chloride, bromide or iodide of a transition metal, a lanthanide, an actinide, an alkali metal, aluminum, zinc, cadmium, mercury, calcium, strontium or barium; such as $AuCl_3$, $FeCl_3$, $HgBr_2$, $HgCl_2$, $HgF_2$, $NbBr_5$, $NbF_5$, $NbCl_5$, $OsF_5$, $TiCl_4$, $TiCl_3$, $TiBr_4$, $ZrCl_4$, $ZrBr_4$, $MoF_5$, $MoCl_5$, $NiCl_2$, $CoCl_2$, $WBr_5$, $WCl_5$, $WCl_6$, $AlCl_3$, $ReCl_5$, $ReCl_6$, $ReBr_4$, $PbBr_2$, $PbCl_2$, $TaCl_5$, $TaF_5$, $TaBr_5$, $TaI_5$, $SnBr_4$, $SnCl_2$, $SnCl_4$, $SnF_2$, $SnF_4$, $VCl_4$, $VCl_3$, $VCl_2$, $ZnBr_2$, $ZnBr_4$, etc. More usually, the metal halide is a metal chloride, even more usually $TaCl_5$.

The laser output power enhancing substance may be generated from the metal halide in any of a number of ways. For example, if the metal halide was a sufficient vapour pressure at the operating temperature of the laser, sufficient laser output power enhancing substance or its precursor may be provided by vaporisation of the metal halide, and the quantity of laser output power enhancing substance may be controlled by adjusting the temperature of the discharge tube. Alternatively, a beam of high energy electrons may be directed at a quantity of the metal halide located in the laser assembly, for example if the electron beam has sufficient energy to dissociate the metal halide. As a further possibility, the metal halide may be placed between a pair of electrodes in the laser assembly and subjected to a radio-frequency or dc discharge by applying a radio-frequency ac potential difference or a dc potential difference across the electrodes.

Alternatively, a quantity of one or more pure metals or a metal oxide, hydroxide, carbonate or other salt capable of reacting with a gaseous halogen-containing reagent to form a halide of the metal may be included in the discharge tube and the tube pre-conditioned with a gaseous halogen-containing reagent which is capable of reacting with the metal(s) or salt(s), optionally at an elevated temperature, for a period of time sufficient to form an amount of a halide of the metals(s).

Thus, according to a fifth form of the present invention there is provided a metal vapour laser comprising a discharge tube and capable of operating at high temperature, the laser comprising a quantity of a first metal capable of providing a sufficient metal vapour pressure at the high temperature to permit laser light to be produced by the laser at the high temperature, characterised in that the laser further comprises a quantity of a second metal or salt thereof, the second metal being different from the first metal, the second metal or salt being capable of reacting with a gaseous halogen-containing reagent to produce a halide of the second metal, wherein the halide of the second metal, or a species derived therefrom under an operating condition of the laser, enhances the output power of the laser.

According to a sixth form of the invention there is provided a process for operating a metal vapour laser comprising a discharge tube having a buffer gas therein and operating at high temperature, the process comprising:

providing in the laser a quantity of a first metal and a quantity of a second metal or salt thereof, the second metal being different from the first metal, the first metal being capable of providing a sufficient metal vapour pressure at the high temperature to permit laser light to be produced by the laser at the high temperature, and the second metal or salt thereof being capable of reacting with a gaseous halogen-containing reagent to produce a halide of the second metal;

pre-conditioning the laser by contacting a gaseous halogen-containing reagent with the second metal or salt thereof in the discharge tube at a temperature lower than the high temperature for a time and under conditions sufficient for a halide of the second metal to be formed;

raising the temperature of the discharge tube to the high temperature;

passing a buffer gas through the discharge tube; and generating a discharge in the discharge tube and producing laser light from the laser.

Typically, the gaseous halogen-containing reagent is a halogen or a hydrogen halide, more typically a hydrogen halide such as HCl or HBr, still more typically hydrogen chloride. The second metal may be a transition metal, lanthanide, actinide, alkali metal, aluminum, zinc, cadmium, mercury, calcium, strontium or barium. Usually, the second metal is tantalum, zirconium, palladium, nickel, niobium, platinum, copper, aluminum, titanium, molybdenum, tungsten, lead, rhenium or tin. More usually, the second metal is tantalum.

The second metal may be provided as one or both of the electrodes of the laser. That is, one or both of the electrodes of the laser may be constructed of one or more of the transition metals, lanthanides, actinides, aluminum, zinc, cadmium, mercury, calcium, strontium or barium: for example tantalum, zirconium, palladium, nickel, niobium, platinum, copper, aluminum, titanium, molybdenum, tungsten, lead, rhenium or tin. A quantity of the second metal may also be provided elsewhere in the laser, in which case one or both of the electrodes need not include an amount of the second metal, and the electrodes may then be constructed of the first metal, or stainless steel, inconel, or other metal generally known in the art for forming the electrodes of metal vapour lasers.

Thus, the second metal or salt thereof may be positioned in a region of the laser discharge tube assembly in which the second metal or salt thereof is contacted with the gaseous halogen containing reagent. In one form of this embodiment of the invention the second metal is positioned in a region of the laser which reaches a temperature sufficiently high to provide an adequate vapour pressure of the metal halide and/or dissociated metal and halogen atoms in the discharge tube. In this arrangement, the quantity of laser output power enhancing substance in the laser may be controlled by adjusting the temperature of the laser. Alternatively, the second metal or salt thereof may be positioned in a region of the laser where, after having been reacted with the halogen-containing reagent, it may be bombarded with high energy electrons or subjected to an ac or dc discharge as described herein above. Typically, the second metal is positioned in a space between the cathode of the laser and the discharge tube, or within an input line of the gaseous halogen-containing reagent, or impregnated into an insulator which typically separates the discharge tube from an outer vacuum tube, or within an end-bell of the laser.

The second metal, or its salt, or a metal halide included in the laser may be provided in the form of solid pieces of the metal, salt or halide, or in powdered form, or impregnated into a suitable pourer carrier such as glass matting or fibrous ceramic material (including for example an insulator surrounding the discharge tube of the laser) or a sintered metal.

In one embodiment of the invention a laser discharge tube containing an amount of the second metal, such as tantalum, or a salt thereof, is pre-conditioned by flowing the gaseous halogen-containing reagent, typically a gas containing a hydrogen halide, usually hydrogen chloride, through the discharge tube at ambient temperature or at an elevated temperature. Following the pre-conditioning period, the laser may be operated with a flow of inert gas passing through the discharge tube, or a flow of a mixture of an inert gas and hydrogen or other additive as exemplified herein above, or a flow of a mixture of an inert gas, additive such as hydrogen, and laser output power enhancing substance, typically hydrogen chloride. Usually, in this form of the invention, the laser is operated after the pre-conditioning period with a mixture of hydrogen and neon flowing through the discharge tube. More usually, immediately after pre-conditioning, the concentration of hydrogen in the flowing gas is very low or zero, and the concentration of hydrogen in the flowing gas is then typically increased to about 2–3% by volume over the stable operating life of the laser.

It has been found that the incorporation of a metal such as tantalum in the laser as described above makes for easier and more precise control of the operation of the laser, and its output is stable for extended periods.

It has further been found that the inclusion in the laser of a quantity of a third metal, different from the first and second metals, or of a metal halide as well as the second metal, further enhances the power output of the laser. Thus, the invention also provides a laser in accordance with the fifth form of the invention and further comprising a quantity of a substance selected from the group consisting of a third metal and a metal halide, the third metal being different from the first and second metals. Also provided is a process in accordance with the sixth form of the invention and further comprising providing in the laser a quantity of a substance selected from the group consisting of a third metal and a metal halide, the third metal being different from the first and second metals. The metal halide may be nay of the metal halides exemplified herein above. In this form of the invention, the second metal is typically provided as one or both of the electrodes of the laser, and is more typically tantalum. The third metal may be any of those metals disclosed herein above as suitable for the second metal, but is typically selected from the group consisting of Au, Fe, Hg, Nb, Os, Ti, Zr, Mo, Ni, Co, W, Al, Re, Pb, Ta, Sn, V and Zn.

In yet a further alternative embodiment of the invention, an intimate mixture of a metal and a solid halogen-containing reagent, typically a halide of the metal, is included in the laser discharge tube. The solid halogen-containing reagent is selected to be capable of reacting with the metal in the discharge tube to produce a relatively volatile halide of the metal. Thus, for example, the laser discharge tube may be provided with a quantity of tantalum metal and also a quantity of tantalum pentachloride. Similarly, in the case of the copper vapour laser for example, a mixture of copper and cupric halide may be included in the discharge tube. In this example, when the tube is heated, chemical reaction takes place between the copper and the cupric halide, forming cuprous halide which, on further heating, dissociates and forms halogen atoms. In this alternative also, hydrogen is typically included in the buffer gas.

In still a further alternative embodiment of this form of the invention, a metal hydride and a metal halide are included in the laser discharge tube, the metal halide being capable of providing the laser output power enhancing substance at the operating temperature of the laser, and the metal hydride being capable of providing an additive capable of controlling the concentration of laser output power enhancing substance on the discharge tube. Typically, the metal halide is one of the metal halides exemplified herein above, and the metal hydride is typically a hydride of palladium, lanthanum, yttrium, erbium, cerium and other rare earth metals, uranium, scandium, vanadium, titanium, zirconium, tantalum, niobium, chromium, manganese, iron, cobalt, nickel, thorium, copper, magnesium and alloys of two or more thereof, such as "Mischmetal", "Mischmetal"-Ni, $LaNi_5$, $Mg_2Ni$, FeTi, Fe—Ti—Mn, Fe—Ti—Cr, Fe—Ti—Co, $Alth_2$, $CaAg_2$, Ti—Mn, Ti—Cu, Ti—Ni, Zr—Ni, V—Nb, $Mg_2Cu$ or Zr—U.

In these embodiments, where the discharge tube is pre-conditioned, the preconditioning may be at ambient temperature or at an elevated temperature. Usually, the discharge tube is pre-conditioned at elevated temperature, more usually in the range 100–1000° C., even more usually 200–950° C. or 300–930° C. or 400–900° C. or 500–890° C. or 600–880° C. or 700–870° C. or 800–860° C., still more usually about 850° C. Typically, the pre-conditioning is carried out with a mixture of inert gas and the precursor of the laser output power enhancing substance or gaseous halogen-containing reagent, or with the precursor of the laser output power enhancing substance or gaseous halogen-containing reagent alone. More typically, the pre-conditioning is carried out with the precursor of the laser output power enhancing substance or gaseous halogen-containing reagent alone. The pre-conditioning period is typically from 1 hour to 10 weeks, more typically from 2 hours to 1 week, even more typically from 3 hours to 24 hours, still more typically from 6 hours to 12 hours and yet more typically about 10 hours. The precursor of the laser output power enhancing substance or gaseous halogen-containing reagent in this embodiment is typically a halogen or a hydrogen halide, more typically chlorine, bromine, hydrogen bromide or hydrogen chloride, and the inert gas during the pre-conditioning period is typically neon, argon or helium, more typically neon. The concentration of precursor of the laser output power enhancing substance or gaseous halogen-containing reagent in the inert gas in the pre-conditioning period is typically from 0.01% to 100% by volume, more typically from 2% to 40% by volume, even more typically from 3% to 30%, still more typically from 4% to 25%, yet more typically from 5% to 20%, from 8% to 15% or about 10% by volume.

Usually, during the pre-conditioning period, the partial pressure of the precursor of the laser output power enhancing substance or gaseous halogen-containing reagent is in the range of 13 Pa to 101 kPa, more typically 100 Pa to 50 kPa, or 250 Pa to 40 kPa or 500 Pa to 30 kPa or 1 kPa to 25 kPa or 2 kPa to 20 kPa or 4 kPa to 18 kPa or 6 kPa to 16 kPa or 8 kPa to 15 kPa or 10 kPa to 14 kPa, still more typically about 13 kPa. During the pre-conditioning period, the partial pressure of the inert gas is usually in the range of 0 to 13 kPa, more typically 1 kPa to 12 kPa, or 1.5 kPa to 11 kPa or 2 kPa to 10 kPa or 2.5 kPa to 9 kPa or 3 kPa to 8 kPa or 3.5 kPa to 7 kPa or 4 kPa to 6 kPa, still more typically about 5.3 kPa.

Typically, in this embodiment, after the pre-conditioning period the metal vapour laser is operated with a buffer gas including an additive as described above, the additive more typically being hydrogen. Under these conditions, the properties of the plasma in the discharge tube may be finely controlled by the partial pressure of the additive in the buffer gas. In particular, the rate at which hydrogen halide is produced in the discharge tube from metal halide formed as described above can be affected by varying the partial pressure of hydrogen or other similar additive in the buffer gas. Alternatively, the concentration of hydrogen halide can be controlled by varying the flow rate of a buffer gas mixture which is a mixture of hydrogen or other similar additive and an inert gas such as neon. The partial pressure of additive included in the buffer gas in this and other embodiments of the invention is dependent on the residual level of laser output power enhancing substance in the discharge tube (which varies over time during the operation of the laser) and the application for which the laser is required (for example maximum plane/plane output power or maximum high beam, quality output power). Typically, the range of partial pressures of additive in the buffer gas after the pre-conditioning phase is from 1 Pa to about 2000 Pa, more usually from 2 Pa to 1500 Pa or 3 Pa to 1200 Pa or 4 Pa to 1000 Pa or 5 Pa to 950 Pa or 6 Pa to 900 Pa or 7 Pa to 850 Pa or 8 Pa to 800 Pa or 10 Pa to 750 Pa or 12 Pa to 700 Pa, even more usually about 13 Pa to about 665 Pa.

In one particular embodiment of the second form of the invention, the process involves pre-conditioning the discharge tube with either hydrogen halide or halogen. The optimal concentration of hydrogen halide produced in the tube during lasing conditions may be controlled by varying the level of hydrogen (or $D_2$) added to a neon buffer gas. Alternatively the concentration of $H_2$ in the plasma region may be controlled by a "getter" as exemplified above. As a further alternative, a quantity of metal hydride may be included in the discharge tube. When the discharge tube is brought to operating temperature the hydride dissociates into metal and hydrogen atoms, and the quantity of additive (hydrogen atoms in this case) may be controlled, at least in part, by varying the temperature of the laser tube. Typically, however, some hydrogen gas is also included in the buffer gas of the laser in this form of the invention. The concentration of $H_2$ introduced into a neon (or helium) buffer gas is dependent on the residual level of halogen atoms in the tube (which may vary with time) and the application for which the laser is required (i.e. maximum plane/plane output power or maximum high beam, quality output power), and may be between from 13 Pa to 665 Pa. Indeed, the laser can still be operated in the same way as a conventional metal vapour laser (after pre-conditioning) by flowing a pure inert gas such as neon, as buffer gas. The laser may also be operated by flowing a pure inert gas as buffer gas through the discharge tube when the discharge tube is provided with an amount of a metal halide such as $TaCl_5$, as described herein.

In another embodiment of the invention, the buffer gas is admitted to the metal vapour laser throughout the operation of the laser, as a premixture of the inert gas and the laser output power enhancing substance or its precursor. Alternatively, in this embodiment the inert gas and the laser output power enhancing substance or its precursor may be separately admitted to the discharge tube throughout the operation of the laser. For example, hydrogen halide may be added to the buffer gas prior to its admission to the discharge tube, or an inert gas such as neon and hydrogen halide may be separately admitted to the discharge tube. In this embodiment, the concentration of laser output power enhancing substance of its precursor in the discharge tube during the operation of the metal vapour laser is typically 0.1 Pa to 1000 Pa, more typically from 0.5 Pa to 800 Pa or 1 Pa to 600 Pa or 2 Pa to 500 Pa or 4 Pa to 400 Pa or 6 Pa to 350 Pa or 8 Pa to 300 Pa or 10 Pa to 280 Pa, still more typically from 13 Pa to 260 Pa.

In a still further particular embodiment of the invention the concentration of hydrogen halide in the plasma region can be controlled by adding a combination of $H_2$ (or $D_2$ or another isotope of hydrogen) and hydrogen halide, or a combination of $H_2$ (or $D_2$ or another isotope of hydrogen) and halogen to the buffer gas.

In each embodiment of the process of the invention, the metal vapour laser may be operated with a slow flow of the buffer gas maintained through the metal vapour laser during its entire operation, or it may be operated without the buffer gas flowing. When the metal vapour laser is operated without buffer gas flowing, it will be referred to herein as operating in "sealed off" mode; however it will be appreciated that in the "sealed off" mode it is not essential that the inlet and outlet for the buffer gas to the metal vapour laser be physically sealed, although they may be. In the embodiment of the invention in which the laser discharge tube is pre-conditioned with a precursor of a laser output power enhancing substance, the metal vapour laser may be operated in "sealed off" mode after the pre-conditioning period has been completed, and stable operation of the laser has been achieved. It has been found that once stable optimum or near-optimum conditions for the metal vapour laser of the invention have been achieved, the laser may be operated for extended periods (for example at least 50–100 hours) in the "sealed off" mode. This capability provides a substantial advantage of the metal vapour laser of the invention compared to some previously known metal lasers.

In all embodiments of the invention operation of the metal vapour laser is monitored by measuring the voltage and current pulses supplied to the laser, or by measuring the laser power. A low peak current pulse during operation is indicative of excessive levels of laser output power enhancing substance, which may be controlled by decreasing an amount of additive such as $H_2$ in the buffer gas, or decreasing the amount of laser output power enhancing substance added to the buffer gas, or reducing the operating temperature of the laser (depending on the form of the invention being used) or a combination of two or more of these actions; and a high peak current pulse indicates low levels of laser output power enhancing substance, which may be controlled by taking the opposite action or actions.

When the metal vapour laser is operated with a flow of buffer gas, the flow rate is typically from 0.1 to 200 atm.mL/min per L, more typically from 1 to 200, 2 to 150, 3 to 100, 4 to 80, 5 to 70, 6 to 60, 7 to 55, 8 to 50, 9 to 45 or 10 to 50 atm.mL/min per L of active volume of the discharge tube of the metal vapour laser.

The metal vapour laser of the present invention is typically capable of producing at least 10%, more typically at least 15%, 20%, 30%, 40%, 50%, 60%, 70%, 80% or 90% higher power output, even more typically at least 100%, 120%, 140%, 160%, 180%, 200%, 250% or 300% higher power output, compared to previously known metal vapour lasers. The efficiency of operation of the metal vapour laser of the present invention is similarly at least 10%, more typically at least 15%, 20%, 30%, 40% 50%, 60%, 70%, 80% or 90% higher than that of previously known metal vapour lasers, even more typically the efficiency of operation of the metal vapour laser of the present invention is at least 100%, 120%, 140%, 160%, 180%, 200%, 250% or 300% higher than that of previously known metal vapour lasers.

The process of the present invention permits operation of the metal vapour laser over a wide range of operating parameters such as excitation circuit configurations, repetition rates, buffer gas pressure, laser aperture size, buffer gas flow rates etc.

Furthermore, in the metal vapour laser of the present invention a high fraction of the output power is typically available with high beam quality. This is important in many applications of metal vapour lasers currently under development, such as frequency conversion to the ultraviolet, for ultraviolet micromachining of polymers, ceramics and other materials, pumping of dye lasers, pumping of tunable solid state lasers, industrial plastochemistry, non-linear frequency conversion, medical uses, etc. A metal vapour laser of the present invention is useful in any of these applications, and in other known applications of metal vapour lasers, such as described, for example, in Hecht, J., *The Laser Guidebook,* Second Edition, McGraw-Hill, Inc., 1992 at pages 207–210, the contents of which are incorporated herein by reference. Using a metal vapour laser of the present invention in non-optimised ultraviolet generation, ultraviolet powers of over 3 W at overall energy conversion efficiencies of about 0.07% have been achieved. Furthermore, these advantages are obtainable, with the metal vapour laser of the present invention, by utilising existing discharge tube technology to achieve characteristics similar to or better than those obtainable from previously known metal vapour lasers.

The mechanism by which the inclusion of laser output power enhancing substance in a metal vapour laser provides a greater power output from the laser is not known with certainty, but, without wishing to be bound by any theory, the inventors speculate that the laser output power enhancing substance, for example hydrogen halide, reduces the prepulse electron density in the laser discharge tube during the interpulse period via a mechanism of dissociative electron attachment, this in turn leading to improved prepulse conditions and improved matching between the discharge tube and the excitation circuit, and consequently improved output power. It is observed that when both very low and high amounts of laser output power enhancing substance are utilised in the metal vapour laser of the invention, there may be little or no increase in the power output of the laser. However, with intermediate amounts, an optimum power output occurs. Such an optimum may be readily determined by persons of ordinary skill in the relevant art using no more than routine experimentation, given the teaching provided herein.

BRIEF DESCRIPTION OF THE DRAWINGS

FIG. 1A illustrates in diagrammatic longitudinal cross-section a laser discharge tube assembly for a metal vapour laser of the present invention.

BEST MODE AND OTHER MODES FOR CARRYING OUT THE INVENTION

Figure 1B:
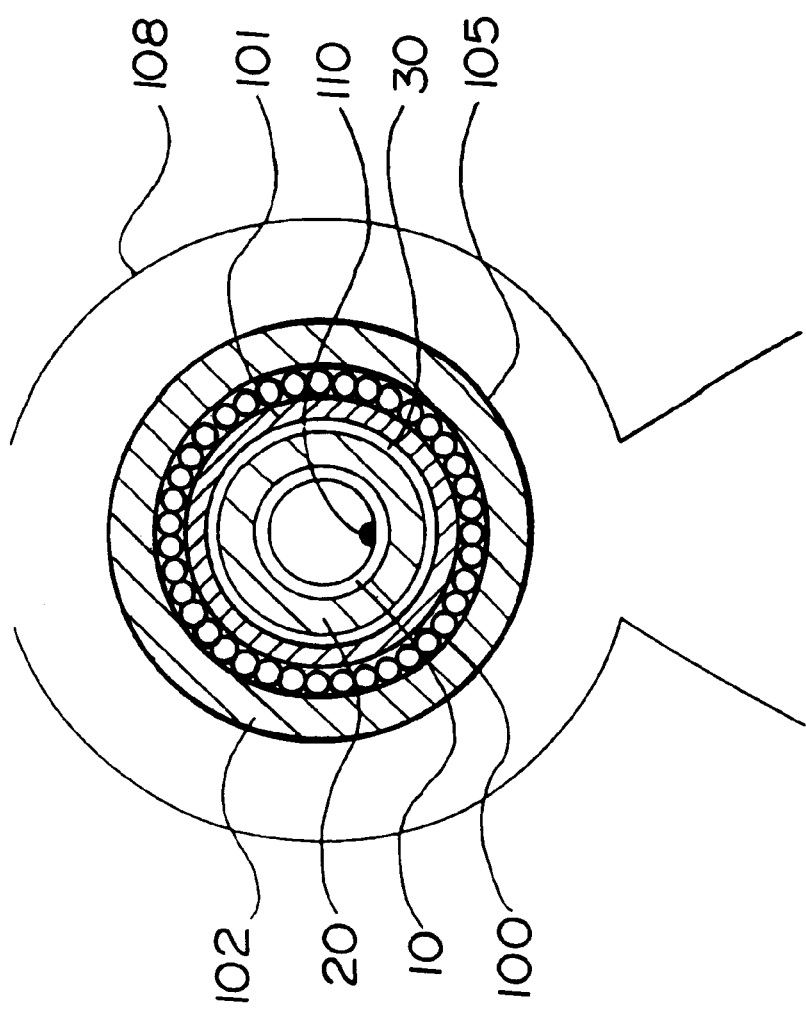
FIG. 1B is a transverse cross-section through the laser discharge tube assembly illustrated in FIG. 1A, at plane A—A.

FIG. 1A illustrates in diagrammatic longitudinal cross-section a laser discharge tube assembly for a medium scale metal vapour laser (nominally 25 W output power) of the present invention. FIG. 1B is a transverse cross-section through the laser discharge tube assembly illustrated in FIG. 1A, at plane A—A. As seen in FIGS. 1A and 1B, laser discharge tube assembly 1 incorporates ceramic discharge tube 10 surrounded by fibrous alumina ceramic high temperature insulator 20 which is located in silica vacuum tube 30. Discharge tube 10 is constructed of alumina (Haldenwanger Alsint nominal purity greater than 99.5%) and has dimensions of 25.5 mm internal diameter, 3 mm thickness and 1000 mm length, giving an active volume of about 0.5 L. The ends of vacuum tube 30 are sealed to end pieces 40, 41 (described in more detail below) which support anode and cathode 50, 51 respectively.

Silca vacuum tube 30 is surrounded by a thin layer of insulation 101 (Triton Kaowool) which is itself surrounded by heating element 100 to provide supplementary heating and another thicker layer of insulation 102 (Triton Kaowool). The surface of outer layer of insulation 102 is surrounded by aluminum foil shell 105. Heating element 100 comprises lengths of nichrome wire (1.7 Ω/m) threaded through a thin ceramic tube (not shown) and is capable of heating discharge tube 10 to a maximum of about 950° C. The assembly of heater 100, insulator layers 101, 102 and foil shell 105 is surrounded by an air space about 1 cm thick within the co-axial current return 108 (seen in FIG. 1B) of the laser. Discharge tube 10 is transversely air cooled through this space, by air provided from fans (not shown) mounted below laser tube assembly 1.

Discharge tube assembly 1 as illustrated is provided with a quantity of pieces of pure tantalum metal 130 in the region between cathode 51 and insulator 20. However it will be appreciated that tantalum pieces 130 may be placed at other locations in laser discharge tube assembly 1 as illustrated in FIG. 10 described below, or they may be omitted.

Figure 3:
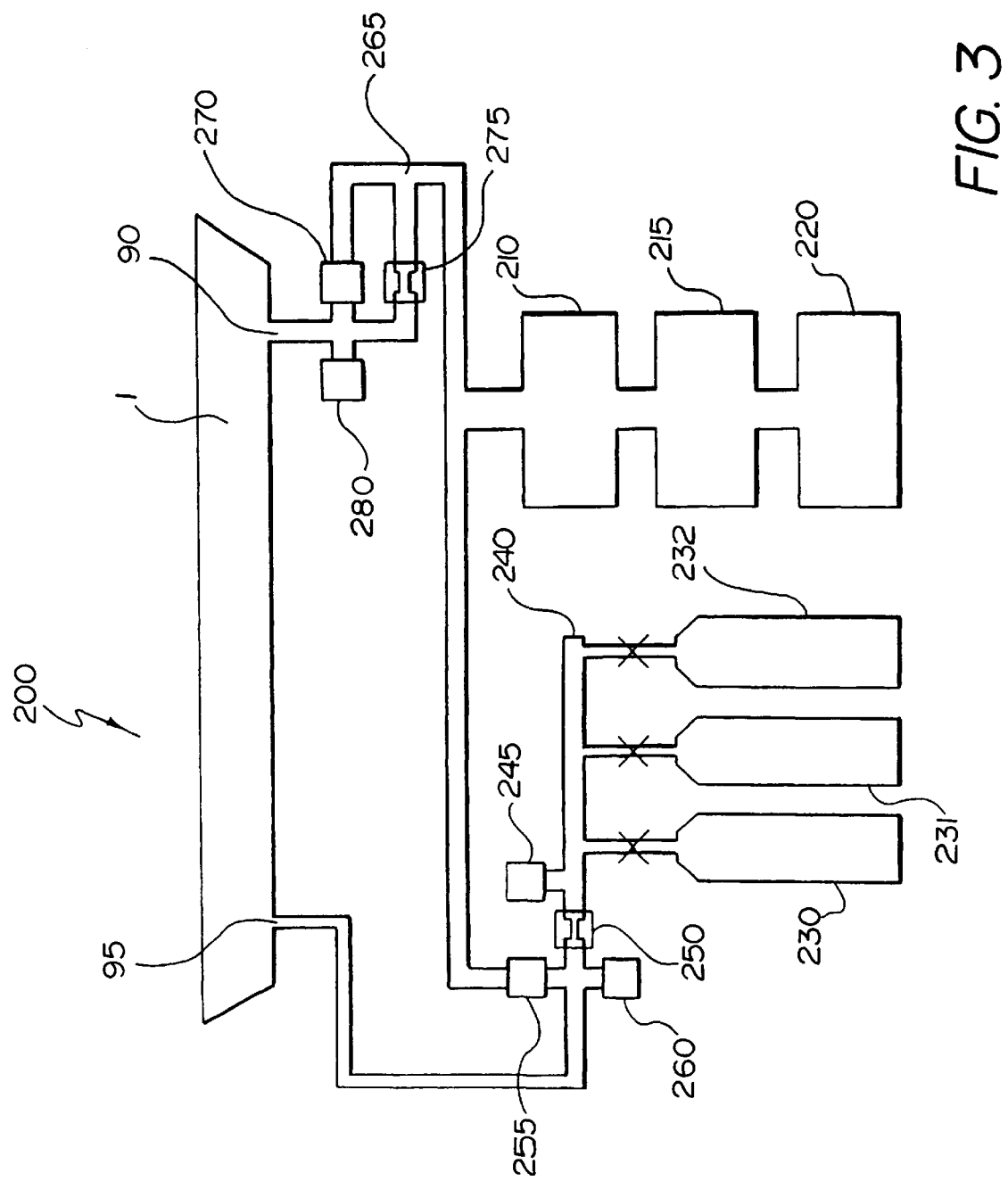
FIG. 3 illustrates in diagrammatic form a vacuum and gas handling system for the laser discharge tube assembly illustrated in FIG. 1A.

Vacuum tube 30 is provided, adjacent each end piece 40, 41, with gas outlet 90 and gas inlet 95 for connection to a vacuum and gas handling system, as illustrated in FIG. 3 described below.

Discharge tube 10 is loaded periodically (approximately each 200 hours of laser operation) with from about 10 to 15 g of high purity metal pieces, typically copper pieces, 110.

Figure 10:
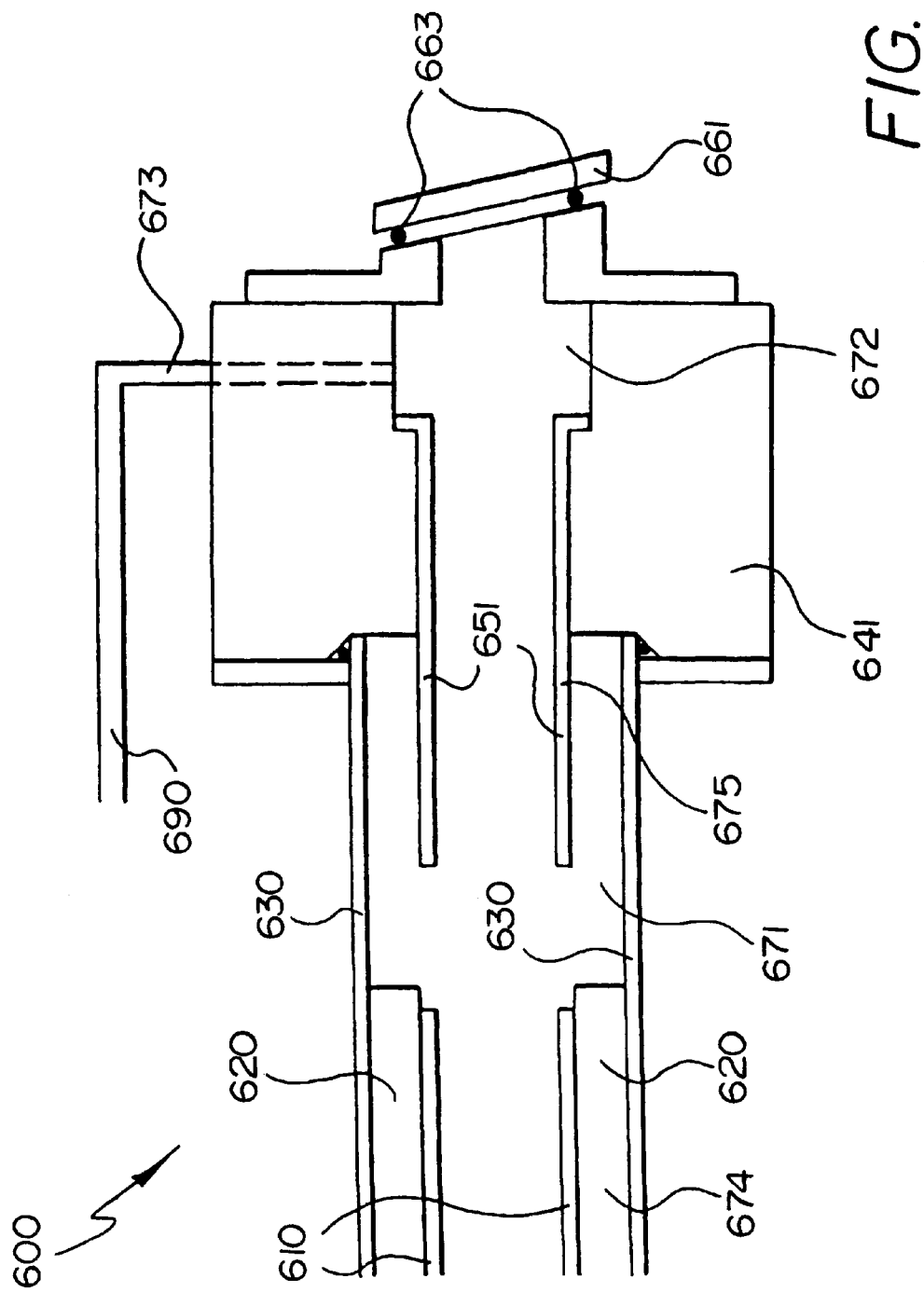
FIG. 10 is a schematic representation of a cross-section through one end of a laser discharge tube assembly in accordance with the present invention, illustrating some possible positions where a quantity of a second metal, salt or halide thereof, or of a metal hydride, may be located.

Referring to FIG. 10 there is illustrated a schematic representation of a cross-section through one end of a laser discharge tube assembly in accordance with the present invention, illustrating some possible positions where a quantity of a second metal (other than the first metal which is the lasing metal), salt or halide thereof, or of a metal hydride, may be located. In FIG. 10, end of laser discharge tube assembly 600 comprises discharge tube 610 surrounded by insulator 620 within silica vacuum tube 630. One end of vacuum tube 630 is closed with end piece assembly 641 which includes electrode 651 and window 661, which is sealed against the exterior of end-piece assembly 641 by O-ring 663. End-piece assembly 641 is also provided with gas input line 690. Positions at which a quantity of metal, metal halide, other metal salt, or metal hydride may be positioned are as follows:

671: under electrode 651;
672: near window 661;
673: in gas input line 690, for example in a temperature controlled oven (not shown);
674: impregnated in insulator 620; or
675: as electrode 651, or forming part of electrode 651, or impregnated in electrode 651.

Figure 2:
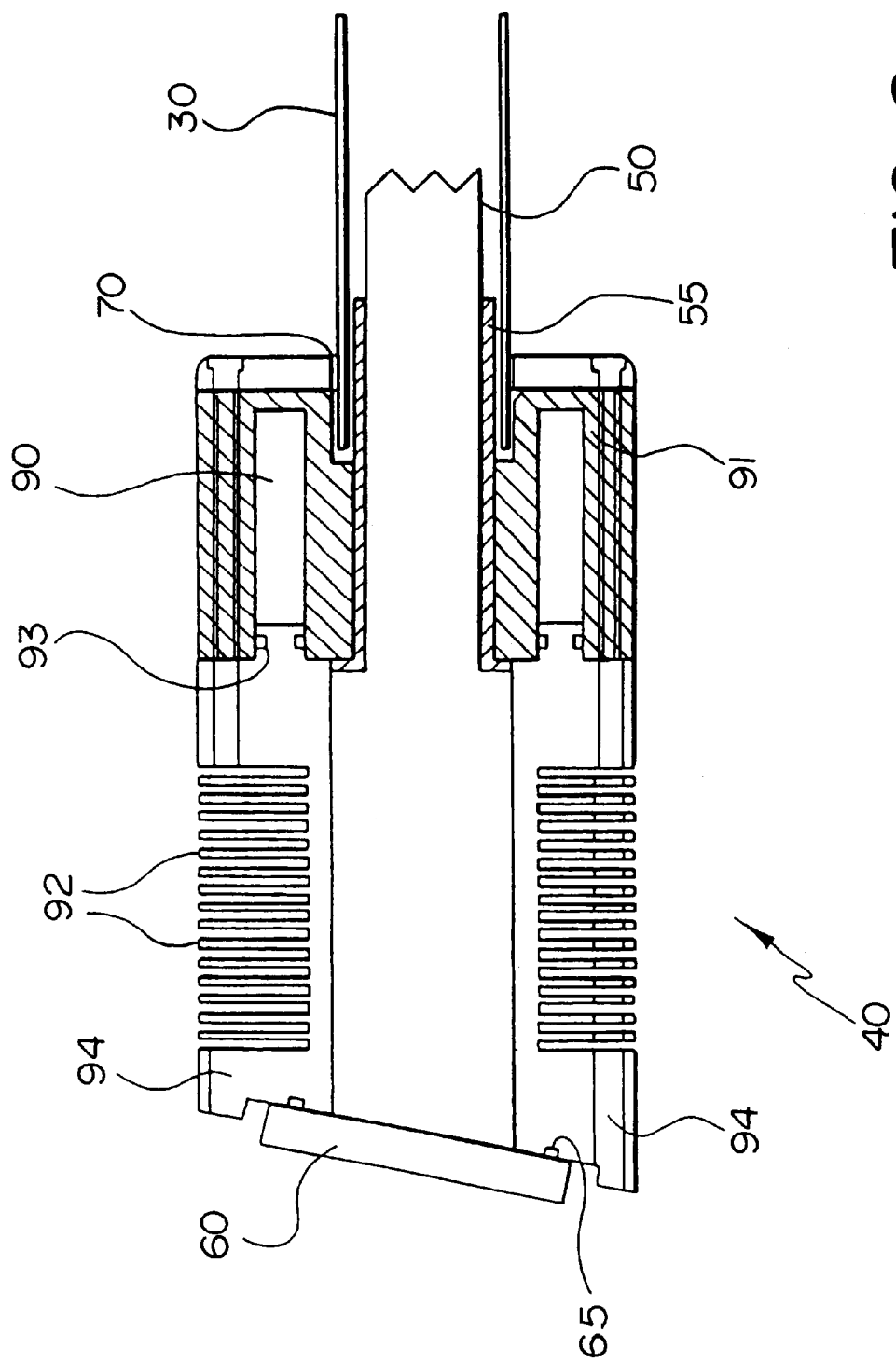
FIG. 2 is a diagrammatic longitudinal cross-section of an end piece of the laser discharge tube assembly illustrated in FIG. 1A.

FIG. 2 is a diagrammatic longitudinal cross-section of end piece 40 of laser discharge tube assembly 1 illustrated in FIG. 1A, which contains electrode 50 and laser window 60 and provides a vacuum seal to silica vacuum tube 30. End piece 41 (seen in FIG. 1A) is of identical construction to end piece 40. Anode 50, made from rolled tantalum sheet, is mounted on removable copper supports 55 for quick replacement, and held in place by a pressure fit. Anode 50 may also be made, for example, from nickel or stainless steel. Window 60 consists of a 50 mm diameter silica flat polished to λ/10 tolerance. Neoprene O-ring 65 forms a vacuum seal between window 60 and the body of end piece 40. Window 60 is held in place against O-ring 65 by virtue of the vacuum in silica vacuum tube 30. Viton O-ring 70 forms a vacuum seal between silica vacuum tube 30 (see also FIG. 1A) and the body of end piece 40. Cooling of end piece 40 is provided by an oil-filled section, air cooling fins 92 and recirculated deionised water which enters end piece 40 at a port on the top surface (not shown) and exits at a port on the bottom surface (not shown). The oil-filled cooling section consists of a coolant jacket 91 sealed by O-ring 93 to the body of end piece 40, jacket 91 defining therewith in coolant chamber 90 which is filled with oil. Coolant jacket 91 is secured to end piece 40 by means of bolts 94.

FIG. 3 illustrates in diagrammatic form a vacuum and gas handling system for a metal vapour laser of the invention. Vacuum/gas handing system 200 comprises a gas mixing section and a vacuum pumping section.

Referring to FIG. 3, the vacuum pumping section of vacuum/gas handling system 200 consists of turbomolecular pump 210 coupled via zeolite water trap 215 to back-up rotary pump 220. Zeolite water trap 215 also serves to prevent pump oil from rotary pump 220 contaminating the vacuum system. The vacuum pumping system communicates via manifold 265, ultra-high vacuum (UHV) valve 270 and leak valve 275 (arranged in parallel) with gas outlet 90 of laser discharge tube assembly 1 (see also FIG. 1A). Gas outlet 90 is fitted with capacitance manometer vacuum gauge 280.

The gas mixing system permits any one or more of three ultra-high purity gas cylinders 230, 231, 232 to be on-line at any one time. Further gas cylinders (not shown) may be connected to the system if desired. Cylinders 230, 231, 232 are connected to mixing chamber 240 fitted with capacitance manometer vacuum gauge 245. Mixing chamber 240 communicates via leak valve 250 with gas inlet 95 of plasma discharge tube assembly 1 (see also FIG. 1A). Mixing chamber 240 may also be connected to the vacuum pumping section by means of UHV valve 255. A further point of connection of a fourth gas cylinder is provided on the open side of second UHV valve 260, which otherwise serves as an air admission port when the laser is not in use.

Each fitting is sealed to the remainder of the system via Conflat flanges (not shown).

Figure 4A:
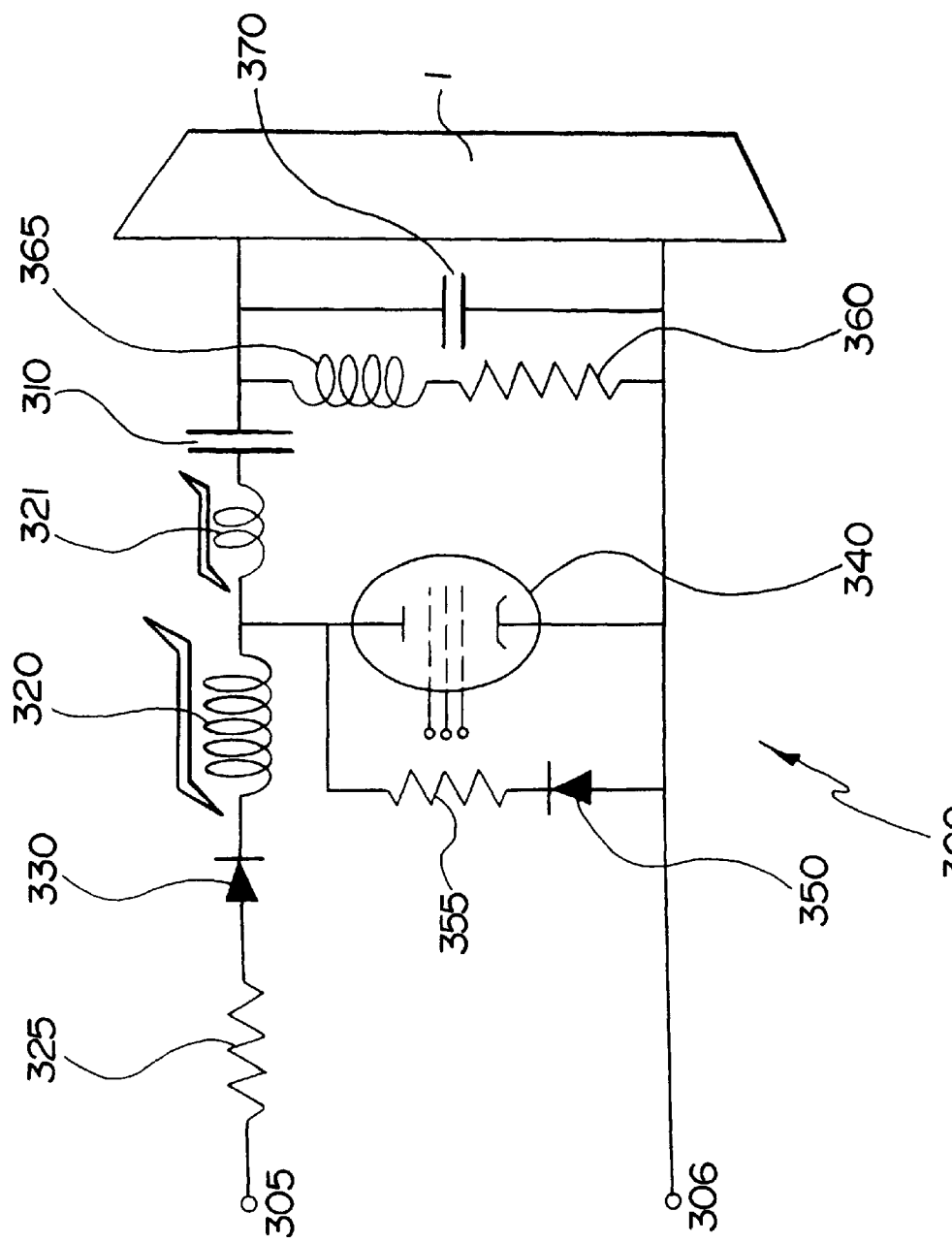
FIG. 4A illustrates an excitation circuit to provide excitation pulses to the laser discharge tube assembly illustrated in FIG. 1A.

FIG. 4A illustrates an excitation circuit which may be used to provide excitation pulses to the laser discharge tube assembly illustrated in FIG. 1A.

Referring to FIG. 4A, excitation circuit 300 is a thyratron-switched pulse charging circuit consisting of a 0–9 kV DC supply (not shown) connected to terminals 305, 306. The DC supply is connected to storage capacitor 310 (2–6 nF) via saturable inductor 320, magnetic assist 321, resistor 325 (100 Ω) and diode 330 (Varo VC80X). Diode 350 and series resistor 355 (1 kΩ) are provided to prevent the reverse voltages which arise from ringing in the discharge circuit from appearing across thyratron 340. Resistor 360 (100 Ω wirewound) and inductor 365 tie one side of storage capacitor 310 to ground during the charging of storage capacitor 310. Peaking capacitor 370 (0.8–2 nF) is connected across electrodes 50, 51 of laser discharge tube assembly 1 (see FIG. 1A and FIG. 2).

When the laser is operated, the temperature of discharge tube 10 is brought to about 850° C. by passing current through heating element 100. If it is desired to pre-condition discharge tube 10, at this stage a mixture of neon and hydrogen chloride (partial pressure of hydrogen chloride of about 13.3 kPa) is admitted from mixing chamber 240 (see FIG. 3) into discharge tube 10 via gas inlet 95 and is allowed to flow slowly through discharge tube 10 and exit via gas outlet 90, for a period of about ten hours. At the end of this period, or if discharge tube has not been pre-conditioned, discharge tube 10 is evacuated by operating rotary pump 220 and, when a sufficiently low pressure has been reached, turbomolecular pump 210. Discharge tube 10 is then filled with a pure Ne buffer gas. With external heater 100 still on, about 1.5 kW input power is applied to terminals 305, 306 of excitation circuit 300 until the lasing threshold temperature (typically 1400° C. in a copper vapour laser) has been reached in discharge tube 10. External heater 100 is then turned off and the input power at terminals 305, 306 is increased to about 3 kW. At this point, if no pre-conditioning of discharge tube was carried out, a mixture of hydrogen gas and hydrogen chloride is added to the neon buffer gas flowing through discharge tube 10. Alternatively, if discharge tube 10 has been pre-conditioned, a quantity of hydrogen gas is mixed with the neon buffer gas. The output power of the laser is then adjusted to its optimum by adjustment of the partial pressure of hydrogen in the buffer gas. The laser typically reaches a steady state after about 1 hour, and at that time the flow of buffer gas may be stopped.

Excitation circuit 300 operates as follows. After each discharge pulse the high voltage DC power supply applied to terminals 305, 306 resonantly charges storage capacitor 310 to nearly twice the supply voltage through resistor 325, diode 330 and saturable inductor 320. Saturable inductor 320 provides extended hold off (~20 μs) to thyratron 340 during its recovery stage after each pulse.

When thyratron 340 is triggered, charge is rapidly transferred from storage capacitor 310 to peaking capacitor 370 through thyratron 340 until the peaking capacitor voltage is sufficiently high to cause breakdown in discharge tube 10. At this time both storage capacitor 310 and peaking capacitor 370 are rapidly discharged through discharge tube 10. In order to ensure the fastest possible rise time of the discharge current pulse, the inductance of the peaking-capacitor—discharge-tube circuit is minimised by maintaining a coaxial geometry throughout. During the fast switching stage, the inductance of wire-wound resistor 350 is sufficiently high that peaking capacitor 370 is discharged through discharge tube 10 rather than through resistor 360.

Additional thyratron protection is provided by magnetic assist 321 to hold off the current flowing through thyratron 340 for several nanoseconds during the switching period in which thyratron 340 is going into conduction. Magnetic assist 321 is provided by including about twenty ferrite toroids on the line connecting the anode of thyratron 340 to storage capacitor 310, providing a saturable inductance in the storage capacitor—thyratron—peaking capacitor charge transfer loop.

Figure 4B:
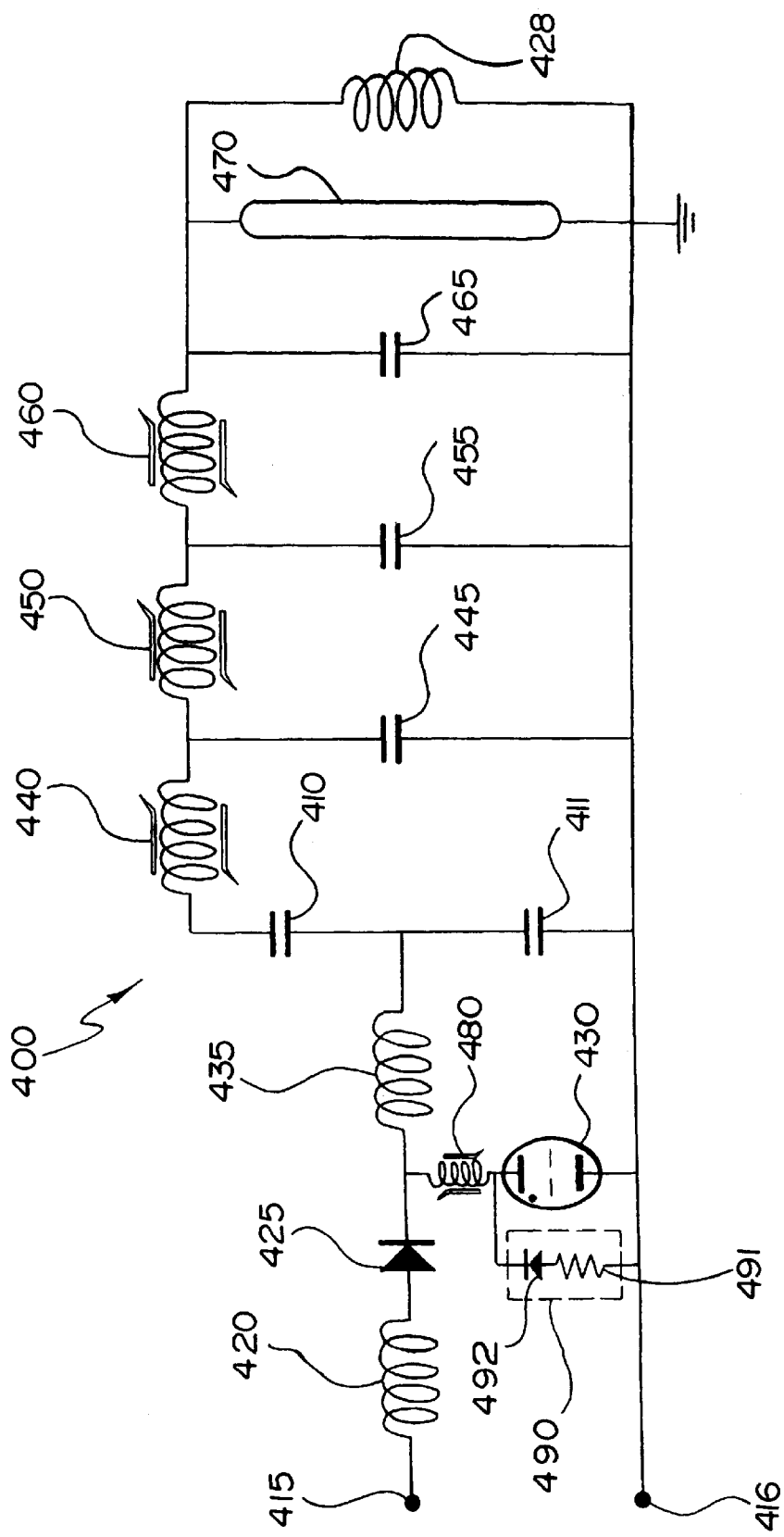
FIG. 4B illustrates an alternative excitation circuit, including three stage magnetic pulse compression.

Alternatively, magnetic switching techniques may be employed to provide excitation pulses to the laser discharge tube. One suitable circuit arrangement is illustrated in FIG. 4B, which represents a magnetically assisted L-C inverter followed by three stage magnetic pulse compression. Circuit 400 illustrated in FIG. 4B operates as follows:

Storage capacitors 410 and 411 are resonantly charged (in parallel) to approximately twice the supply voltage ($V_0$) at terminals 415, 416 via charging inductor 420, charging diode 425 and tube bypass inductor 428 which is connected across the electrodes of metal vapour laser discharge tube 470. When thyratron 430 is switched, the voltage on storage capacitor 411 is reversed via ringing in the subcircuit comprising transfer inductor 435 and storage capacitor 411. The value of transfer inductor 435 is chosen so that the time taken for the voltage on storage capacitor 411 to swing from $+2 V_0$ to $-2 V_0$ is equal to the hold-off time of first saturable inductor 440. Just prior to the saturation of the first magnetic pulse compression stage 440, the voltage across the combination of storage capacitors 410, 411 reaches about $4 V_0$. As the first saturable inductor 440 saturates, the charge on storage capacitors 410, 411 is transferred to capacitor 445, in a time that is shorter (by a factor called the compression ratio) than the time taken to initially invert the voltage on storage capacitor 411. As the charge transfer to capacitor 445 nears completion, second stage compressor 450 saturates, and the charge from capacitor 445 is transferred from capacitor 445 to capacitor 455 in time again shorter by the compression of this stage, than capacitor 455 was charged. The transfer from capacitor 445 is of this stage, than capacitor 455 was charged. The transfer from capacitor 455 to capacitor 465 occurs in the same fashion, caused by saturation of third stage compressor 460, with further compression of the charge transfer time (and hence voltage rise time). As the voltage on capacitor 465 rapidly rises (typically ten times faster than the voltage inversion on storage capacitor 411 occurs) current begins to flow through discharge tube 470 and laser action is excited.

Because of the impedance mismatch between discharge tube 470 and excitor circuit 400, generally some of the energy that is switched to the discharge tube via capacitor 465 is reflected. This reflected energy can cause extreme stress on the switching element, and circuit 400 incorporates two techniques for minimising this stress. Magnetic assist 480 delays zero-current crossing during grid-anode recovery until thyratron 430 has recovered. Snubber 490 (consisting of high-power resistor 491 and diode 492 in series) partially adsorbs energy that is reflected from discharge tube 470.

Other forms of magnetic pulse compression exciters that are routinely used with metal vapour lasers may be used for the metal vapour laser of the present invention. For example, circuits incorporating pulse transformers to increase the voltage from a low voltage source to levels appropriate for laser excitation may be used. Circuits using different switching elements other than thyratrons (for example solid-state switches) may also be used, and capacitance transfer topologies can be used instead of L-C inverter circuits. Such circuits are well known for use with metal vapour lasers and their application with the metal vapour laser of the present invention lies well within the capability of persons of ordinary skill in the relevant art.

The advantages provided by the metal vapour laser of the present invention are not dependent on the type of excitation used for the laser discharge tube.

EXAMPLES

Example 1

Operational characteristics of a metal vapour laser of the invention without pre-conditioning A copper vapour laser having a 25 mm diameter by 1000 mm long laser discharge tube was operated with a neon buffer gas flowing at ~3 atm.mL/min, including various added gases, at 17.5 kHz pulse repetition rate unless otherwise stated, with 1.5 nF of storage capacitance and 0.6 nF of peaking capacitance.

Figure 5A:
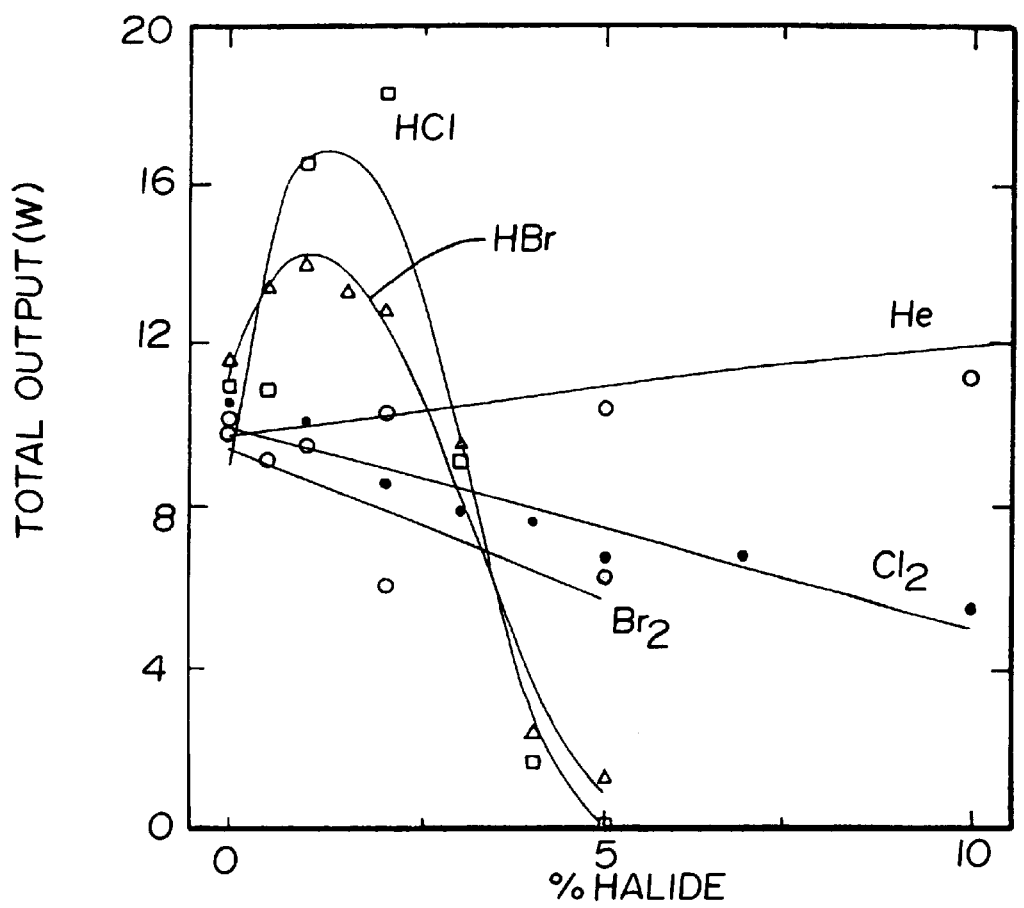
FIGS. 5A to 5C are graphs illustrating the effect of various additives in the buffer gas of a metal vapour laser on the output power of the laser.
Figure 5B:
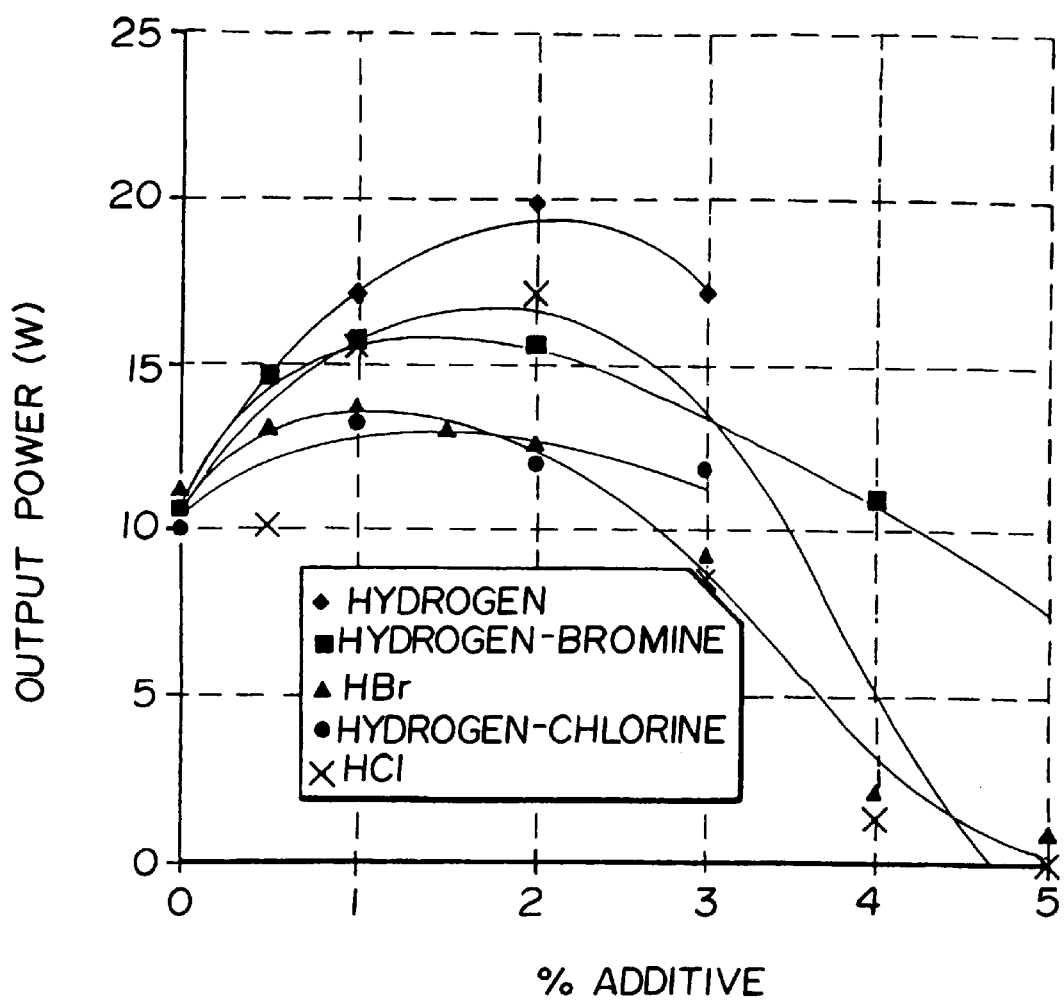
Figure 5C:
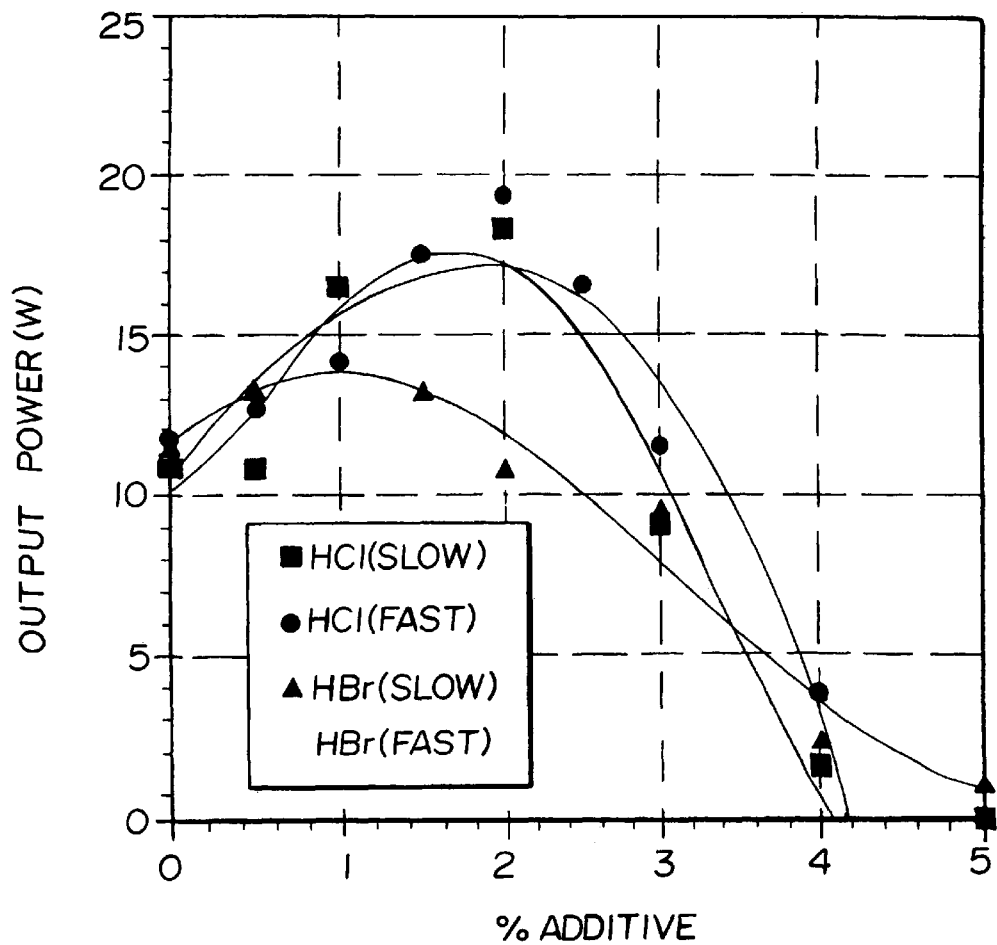

FIGS. 5A to 5C illustrate the effect of the added gases employed on the output power of the laser. It will be seen that in the example illustrated in FIG. 5A the inclusion of chlorine and bromine resulted in a decrease i the output power over the range of concentrations tested, but the addition of hydrogen chloride and hydrogen bromide resulted in a substantial increase in output power over a range of concentrations, with an optimum at 1–2% hydrogen chloride or hydrogen bromide in the buffer gas by volume.

FIG. 5B illustrates the effect of added hydrogen in the buffer gas on the output power of the laser. In this example, various amounts by volume of HBr, HCl, 1:1 $H_2$—$Br_2$ and 1:1 $H_2/Cl_2$ were added to the buffer gas. It will be seen that under these conditions, the addition of a mixture of hydrogen and bromine enhanced the peak output power of the laser compared to the addition of the same amount of HBr, whereas the addition of a mixture of hydrogen and chlorine reduced the peak output power of the laser compared to the addition of the same amount of HCl.

FIG. 5C illustrates the effect of buffer gas flow rate on peak output power of the laser, with various amounts of HCl and HBr added to the neon buffer gas. In this experiment, the laser was operated at slow (approx. 4–5 atm.mL/min) or fast (approx. 60 atm.mL/min) flow rates. The performance of the laser was best when operating with added HBr at relatively fast buffer flow rate, whereas at more typical buffer flow gas rates of about 4 atm.mL/min, optimal performance is achieved when employing HCl/neon buffer gas mixtures.

Figure 6A:
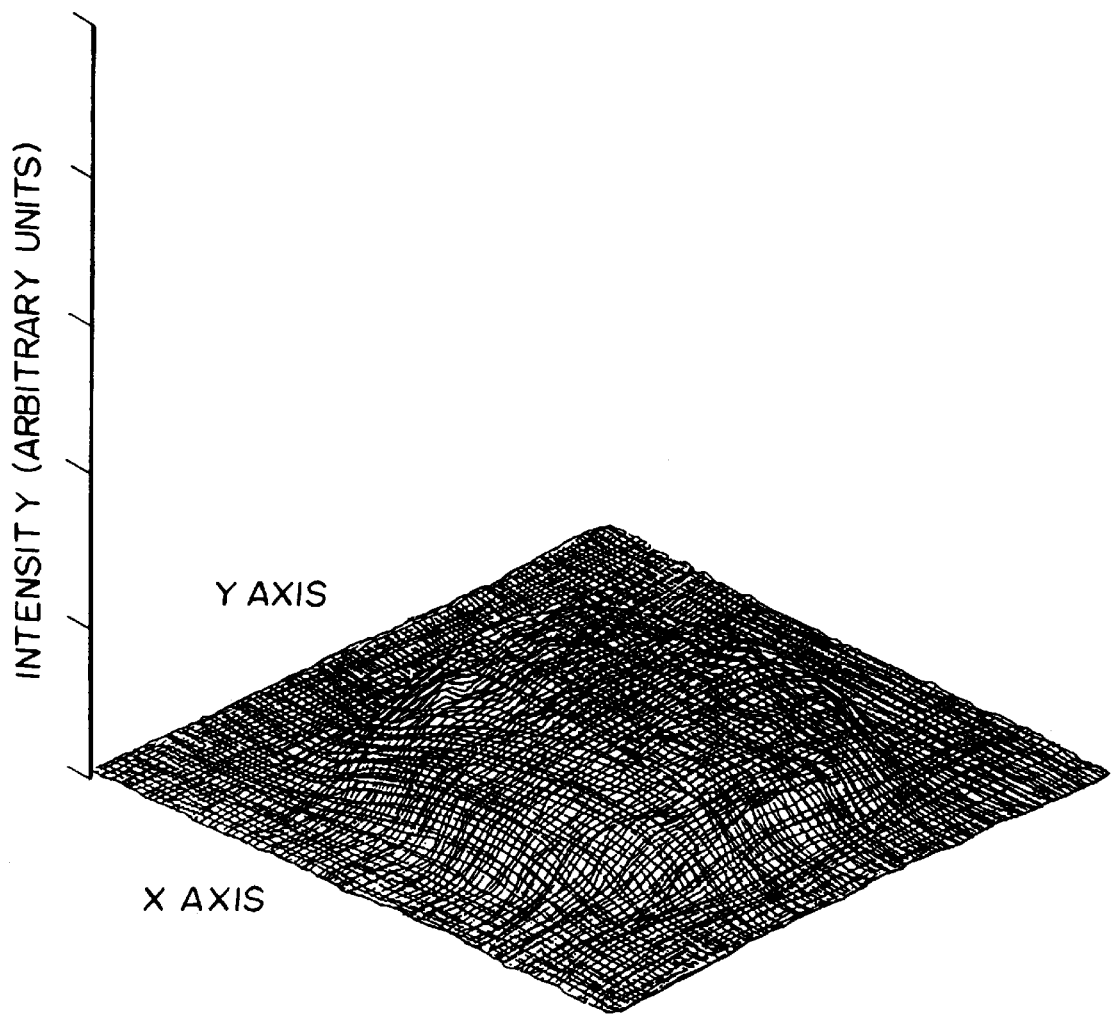
FIGS. 6A to 6C illustrate the spatial near-field profile of the laser beam of a metal vapour laser of the invention, when operated with hydrogen chloride added to the buffer gas, the concentration of hydrogen chloride varying from 0% (FIG. 6A) to 1% by volume (FIG. 6B) and 2% by volume (FIG. 6C).
Figure 6B:
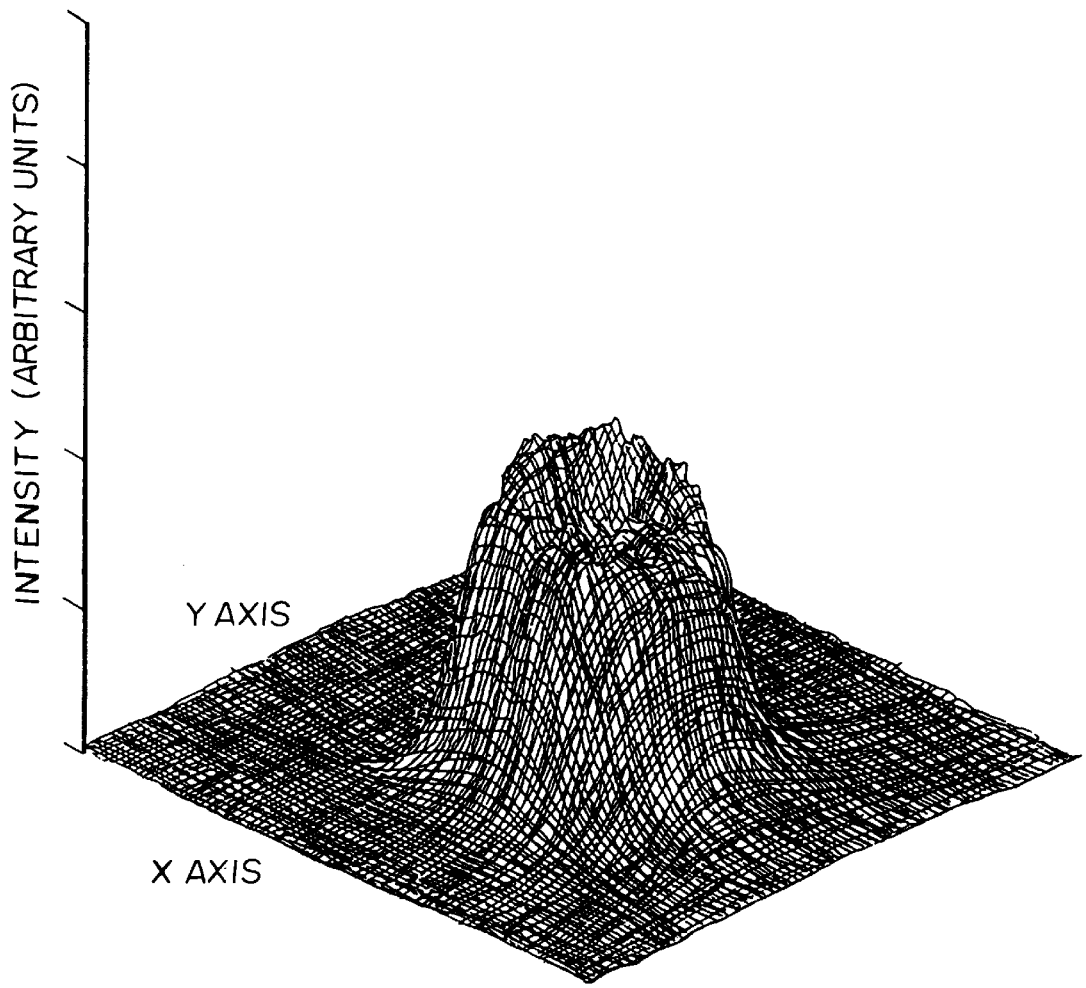
Figure 6C:
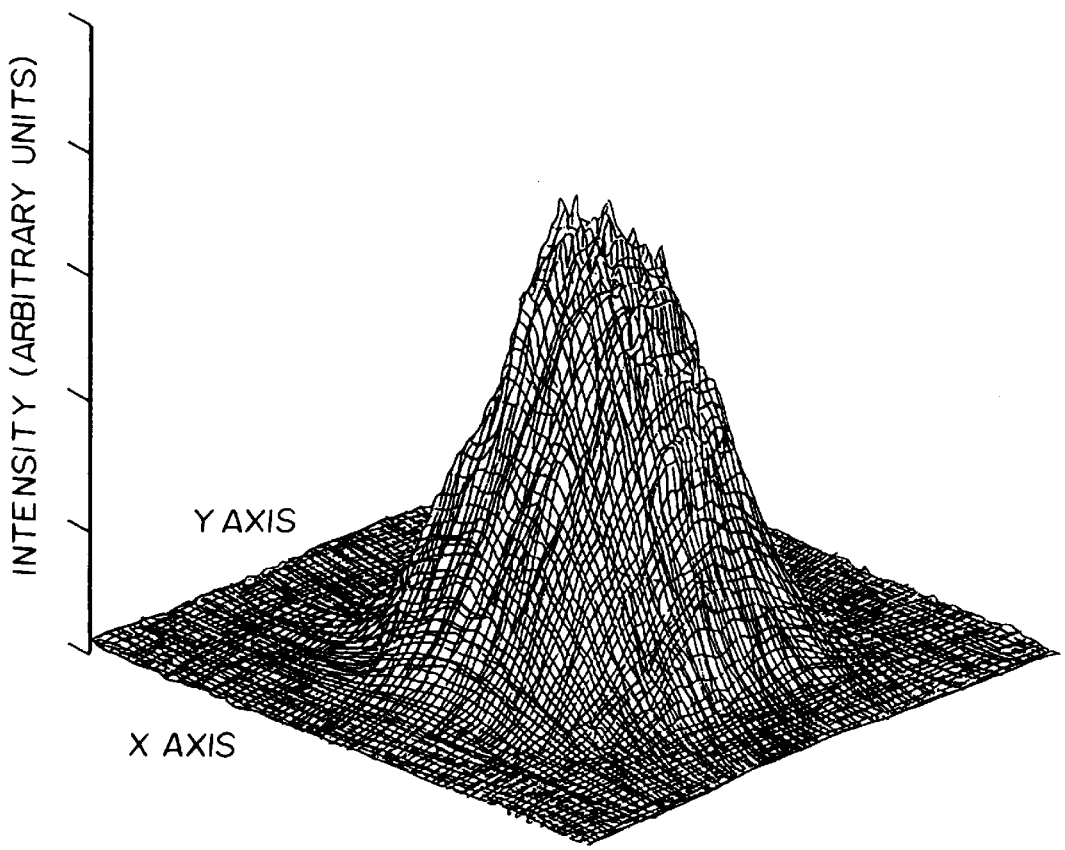
Figure 7:
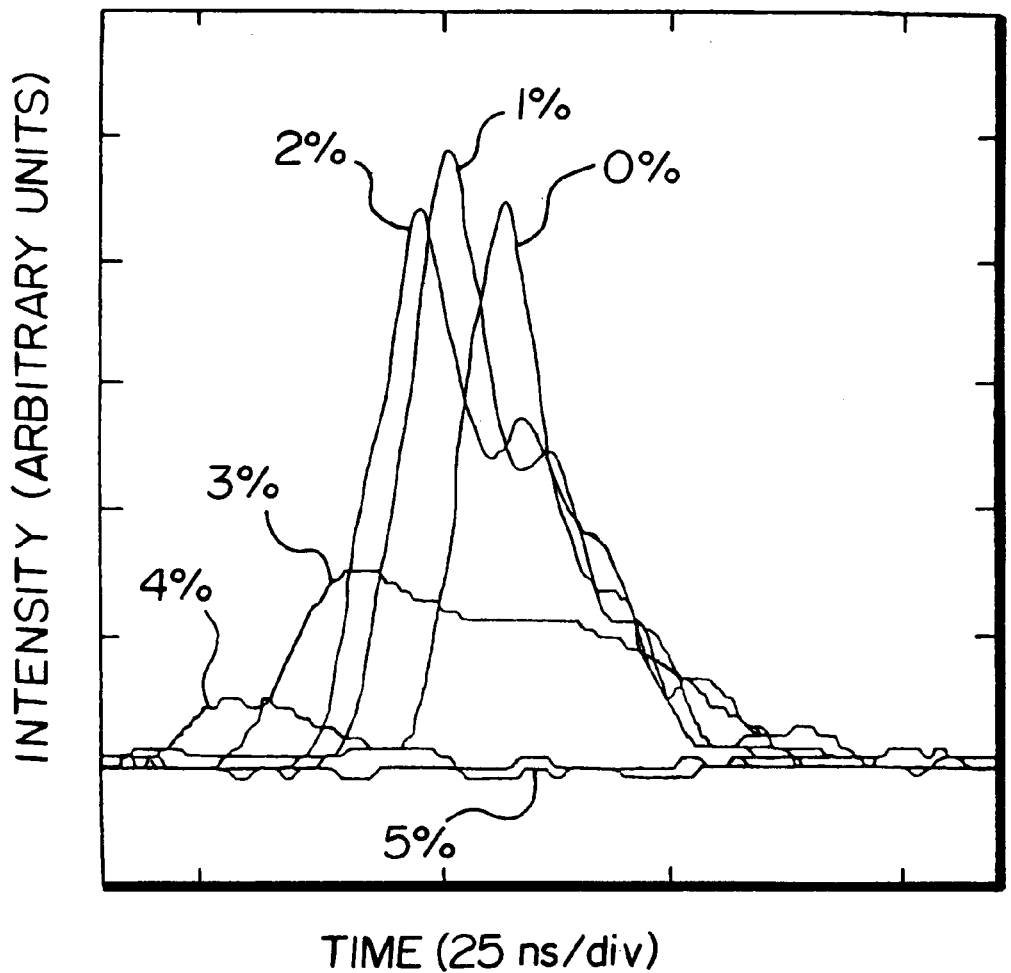
FIG. 7 is a graph of the temporal evolution of the laser pulse of a metal vapour laser of the invention, when operated with varying concentrations of hydrogen chloride added to the buffer gas.
Figure 8A:
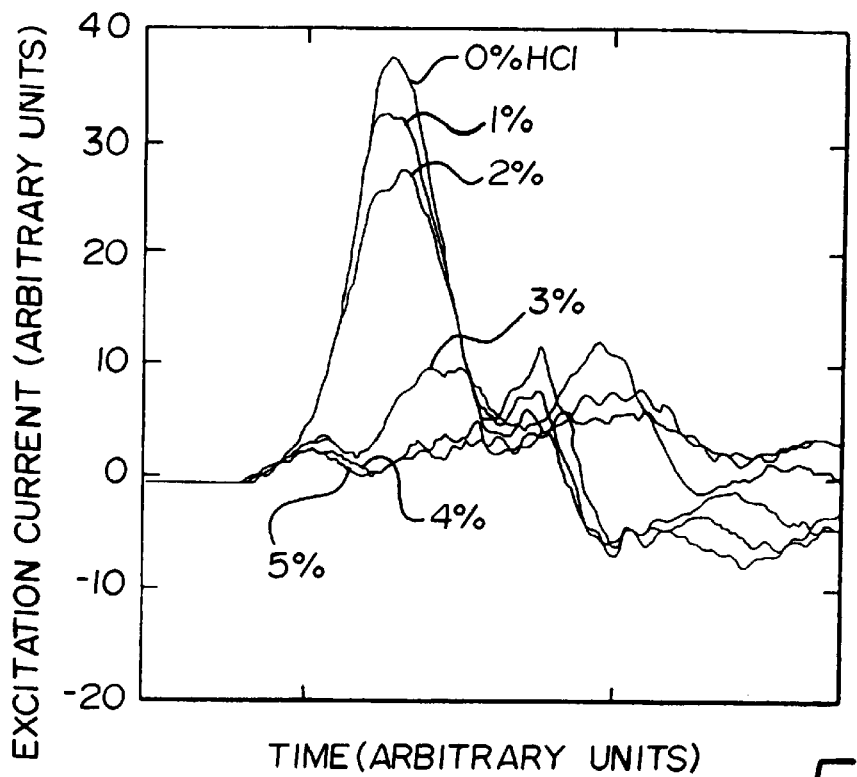
FIGS. 8A and 8B are graphs showing the peak amplitude of the excitation current and voltage pulses, respectively, at a range of hydrogen chloride concentrations in the buffer gas of a metal vapour laser of the invention.
Figure 8B:
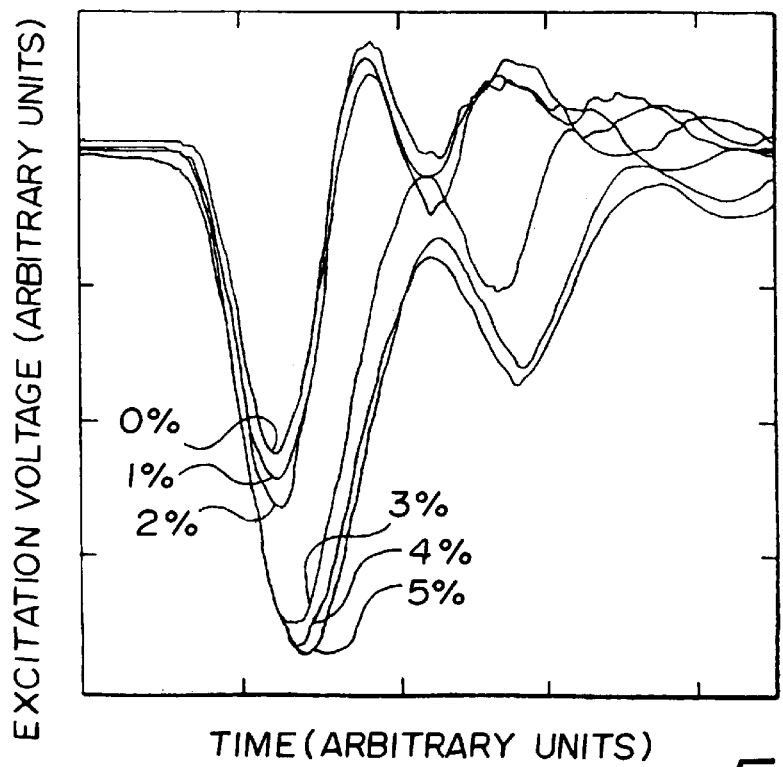

FIGS. 6A to 6C illustrate the spatial near-field profile of the laser beam under the conditions described above in this Example, with hydrogen chloride added to the buffer gas, when the concentration of hydrogen chloride was varied from 0% (FIG. 5A) to 1% by volume (FIG. 6B) and to 2% by volume (FIG. 6C). Similarly, FIG. 7 provides a graph of the temporal evolution of the laser pulse, and FIGS. 8A and 8B plot the peak amplitude of the excitation current and voltage pulses, respectively, at a range of hydrogen chloride additive concentrations. It will be seen that particularly in the range of 1–2% by volume added HCl, the addition of hydrogen chloride to the buffer gas significantly modified the spatio-temporal evolution of the laser pulse and altered the peak amplitude of the excitation voltage and current pulses.

Example 2

Operational characteristics of a copper vapour laser of the invention with a buffer gas including mixtures of hydrogen and hydrogen halides The copper vapour laser used in these experiments was a 40 mm×1.5 m long device (nominally a 55 W device when operated at 4.5 kHz) employing a three stage magnetic pulse compression excitation circuit. For the course of these experiments the laser was operated at a pulse repetition frequency of 9 kHz at reduced input powers (~80% of optimum) so that potential overheating effects, due to the improved impedance matching resulting from some buffer gas additives, could be avoided. The buffer gas flow rates were 2–5 atm.mL/min.

Table 1 shows the output power produced by the laser when operating with a pure neon buffer gas, a 2% $H_2$ additive, and a range of amounts of HBr with 1% $H_2$ buffer gas additive. All additive amounts are given in percentages by volume. Table 2 shows the output power when operating with a pure neon buffer gas, a 2% $H_2$ additive, and a range of amounts of HCl with 1% $H_2$ buffer gas additive.

TABLE 1

| % HBr | % $H_2$ | Output Power (W) |
|---|---|---|
| 0 | 0 | 20 |
| 0 | 2 | 34 |
| 0.5 | 1 | 38 |
| 1 | 1 | 42 |
| 2 | 1 | 45 |
| 3 | 1 | 46 |

TABLE 2

| % HCl | % $H_2$ | Output Power (W) |
|---|---|---|
| 0 | 0 | 20 |
| 0 | 2 | 34 |
| 0.2 | 1 | 44 |
| 0.5 | 1 | 50 |
| 1 | 1 | 40 |

Significant increases in the output power were observed when employing combinations of HBr and $H_2$, the maximum output power corresponding to the addition of 2–3% HBr to a 1% $H_2$—Ne buffer gas. The laser output power under these conditions is greater than that observed when employing 2% $H_2$—Ne buffer gas mixtures. However, the best results were achieved when employing combinations of HCl and $H_2$—Ne buffer gas mixtures. A maximum of 50 W was observed when employing a 0.5% HCl-1% $H_2$—Ne buffer gas.

Example 3

Operational characteristic of a metal vapour laser of the invention with a pre-conditioning period In this Example, a 25 mm diameter copper vapour laser discharge tube was pre-conditioned at 850° C. with the laser off by including 13 Pa to 101 kPa (typically about 13 kPa) partial pressures of HCl, HBr, $Cl_2$ and $Br_2$ in a neon buffer gas, typically at a partial pressure of from 1.3 kPa to 13 kPa, most typically at a partial pressure of about 5.3 kPa, for from 30 minutes to several hours. Subsequently, the laser operated under the conditions described in Example 1, with the exception that a mixture of hydrogen-neon (about 13–260 Pa partial pressure of hydrogen) and pure neon were alternately flowed through the tube until the voltage/current characteristics of the laser resembled those shown in FIGS. 8A and 8B. Under these conditions, the power output of the laser increased from 10 to 30 W for approximately 3 kW input power and was very stable. It was found that the best results were obtained in this Example when the discharge tube was pre-conditioned with either HCl or $Cl_2$.

Table 3 below shows the maximum total output power which achieved in a series of trials with a plane/plane resonator in a 25 mm diameter copper vapour laser of the invention having a hydrogen chloride/hydrogen mixture included in the buffer gas (about 13 Pa to 260 Pa partial pressure of each), together with the non-ASE high beam quality output powers produced from a 25 mm diameter copper vapour laser of the invention when employing on-axis unstable resonators. For comparison, corresponding output power values obtained when the same laser is operated under the same conditions but without added hydrogen chloride (pure neon buffer gas or neon-hydrogen buffer gas: about 13–260 Pa partial pressure of hydrogen) are also provided.

TABLE 3

Total output power (W) from a 25 mm copper vapour laser

| Pulse repetition frequency (kHz) | Buffer gas | | |
|---|---|---|---|
| | Pure neon | Neon-hydrogen | $H_2$—HCl—Ne |
| USR (M = 100) | | | |
| 4–5 | 8.1 | 8.3 | 8.95 |
| 9–10 | 5.0 | 10.6 | 23.7 |
| 18–20 | 1.6 | 8.1 | 20.8 |
| 25 | — | — | 20.0 |
| Plane/Plane | | | |
| 27 | <20 | — | 50.6 |

Table 4 provides similar results for a 40 mm diameter copper vapour laser, which had been pre-conditioned with HCl as described in Example 2 prior to operation with a neon-hydrogen buffer gas mixture.

TABLE 4

Total output power (W) from a 40 mm copper vapour laser

| Pulse repetition frequency (kHz) | Buffer gas | | |
|---|---|---|---|
| | Pure neon | Neon-hydrogen | $Ne/H_2$; laser tube pre-conditioned with HCl |
| USR | | | |
| 4 | 14.8 (M = 20) | 27.6 (M = 20) | — |
| 12 | ~10 (M = 125) | — | 67 (M = 125) |
| Plane/Plane | | | |
| 4 | 46.3 | 56.4 (69 peak) | — |
| 5 | 52.8 | 63.8 | ~75 |
| 13 | ~30 | — | 100.6 |

Examples 4 and 5

Operational characteristics of a copper vapour laser of the invention, including tantalum metal, with a pre-conditioning period Example 4

In this example, the laser described in Example 1 was provided with about 25 g of tantalum metal pieces between the cathode and the plasma tube, and was pre-conditioned for 3–24 hours with about 13 kPa of HCl at a laser wall temperature of about 1000° C. before being evacuated and operated with various buffer gases.

Figure 9A:
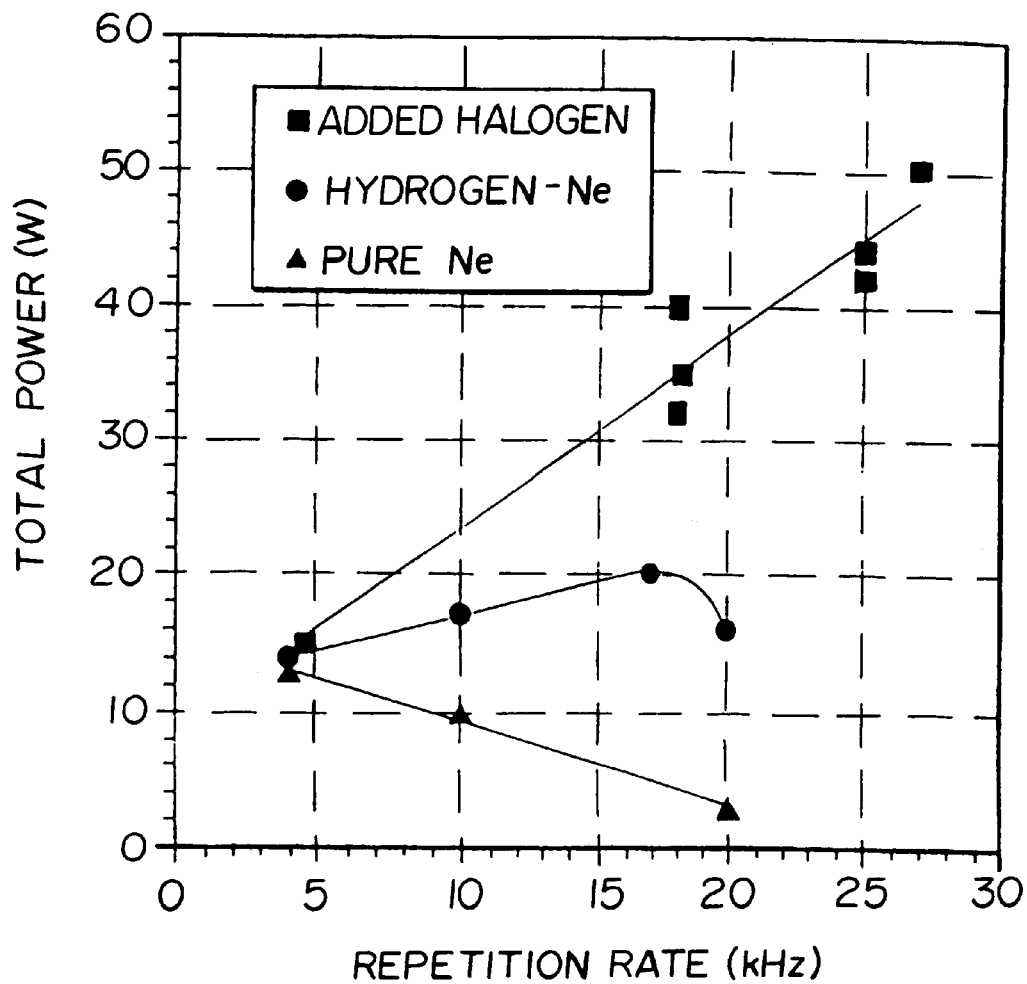
FIGS. 9A and 9C are graphs illustrating the relationship between pulse repetition rates and power output of lasers according to the invention, using three different buffer gas mixtures.

FIG. 9A shows the total output power of the laser operating with a plane/plane resonator with pure Ne, $H_2$—Ne (2% hydrogen by volume) and HCl—$H_2$—Ne (0.5% HCl and 1% $H_2$ by volume) buffer gas mixtures, over a range of pulse repetition frequencies (PRFs). This laser produced a maximum of ~20 W when operated with a 2% $H_2$—Ne buffer gas mixture at a PRF of 17 kHz. The output power of the laser operating with the $H_2$—Ne buffer gas mixture decreased when the PRF was elevated above 17 kHz. Laser performance improved significantly when the $H_2$—Ne buffer gas mixture was replaced with the $H_2$—HCl—Ne mixture. In this case the laser produced 32 W at a PRF of 18 kHz. Furthermore, the $H_2$—HCl—Ne buffer gas mixture permitted efficient PRF scaling of this device. At PRFs of 25 and 29 kHz the laser produced 40 W and 51 W respectively (compared to <<20 W when employing conventional buffer gases).

Figure 9B:
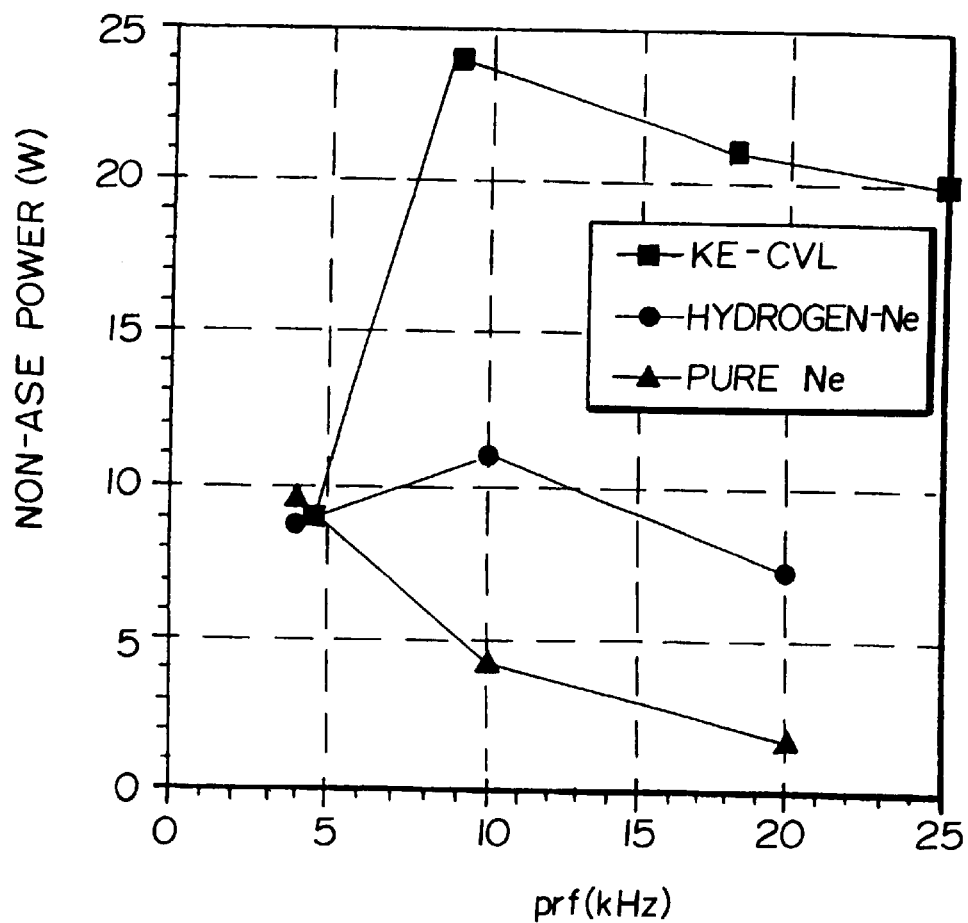

FIG. 9B shows the high beam quality output power of the laser operating with a high magnification (M=100) on-axis unstable resonator and pure neon buffer gas, the $H_2$-neon buffer gas mixture or the HCl—$H_2$-neon buffer gas mixture over a range of PRFs. The high beam quality (HBQ) output power extraction from this device was unaffected by the buffer gas composition when operated at low PRF (~4 kHz). However, significant improvements in the HBQ output were observed when the laser was operated at elevated PRFs with either $H_2$ or $H_2$—HCl added to the neon buffer gas. Added $H_2$ increased the HBQ output power of the laser by up to 3–4 times, while added $H_2$—HCl increased the output power by up to 6–10 times, leading to a maximum of 24 W of high beam quality output.

Example 5

In this example, the laser described in Example 2 was provided with about 25 g of tantalum metal pieces between the cathode and the plasma tube, and was pre-conditioned for 3–24 hours with about 13 kPa of HCl at a laser wall temperature of about 1000° C. before being evacuated and operated with various buffer gases.

Figure 9C:
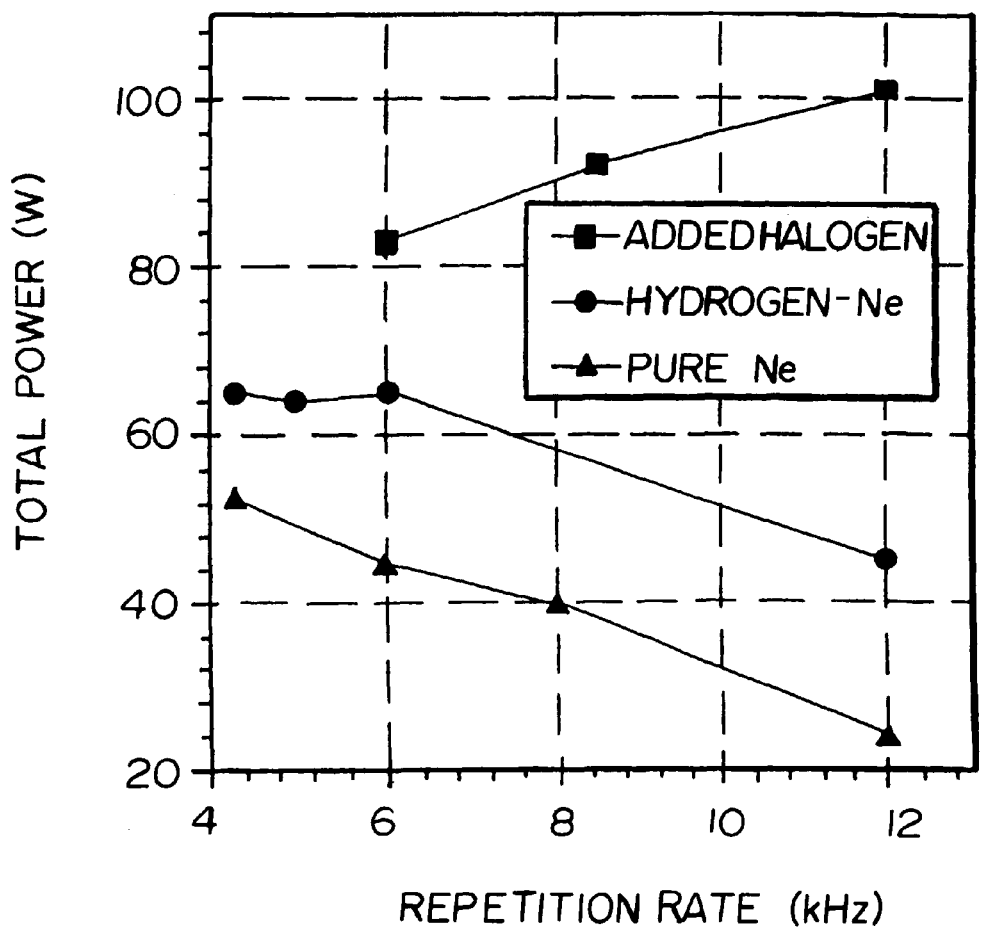

FIG. 9C shows the total output power of the laser operating with a plane/plane resonator with pure Ne, $H_2$—Ne (1% hydrogen by volume) and HCl—$H_2$—Ne (0.5% HCl and 1% $H_2$ by volume) buffer gas mixtures, over a range of PRFs. The laser produced a maximum of 53 W at a PRF of 4.3 kHz when operated with pure Ne buffer gas, and a maximum of 65 W when operated with a 1% $H_2$—Ne mixture. Output power decreased when the laser was operated with conventional buffer gas mixtures at elevated PRFs, but using the HCl—$H_2$—Ne buffer gas mixture the laser produced 80 W at a PRF of 4.3 kHz (compared to 65 W when operating with $H_2$ additive alone) and a maximum of 101 W when operated at an elevated PRF of 12 kHz (compared to ~30 W when operating with added $H_2$ only.) These output powers are comparable to those normally produced by copper vapour laser of twice the volume (ie. diameter>60 cm and lengths >2 m).

When the laser described in this Example was operated with the HCl—$H_2$-neon buffer gas mixture, similar improvements to those described in Example 4 were observed in the extraction off non-ASE output power. At a PRF of 6 kHz the laser produced 15 W of high beam quality output when operating with a high magnification (M=125) on-axis unstable resonator and pure neon buffer gas, and 53 W with the HCl—$H_2$-neon buffer gas mixture. At a PRF of 12 kHz this laser only produced 4 W when employing pure neon buffer gas, which increased by a factor of >15 to 67 W when operating with the HCl—$H_2$-neon buffer gas mixture. This laser also produced 15 W of high beam quality output when operating with the HCl—$H_2$-neon buffer gas mixture and with a self filtering unstable resonator.

The specific output powers of the 25 mm and 40 mm diameter lasers described in Examples 4 and 5, namely 104 mW/cm$^3$ and 54 mW/cm$^3$ respectively, are the highest yet achieved from copper vapour lasers of this size and are comparable to those obtained from copper HyBrID ("Hydrogen Bromide In Discharge") lasers of similar active volumes.

The improved output power extraction of copper vapour lasers operating at elevated PRFs with $H_2$-HCl—Ne buffer gas mixtures results from both modified temporal and spatial gain characteristics. The duration of a copper vapour laser output pulse is significantly shortened (for the same peak power) as the PRF is elevated, leading to a reduction in total output power. For example, at a PRF of 17 kHz the pulse duration of the 25 mm diameter copper vapour laser operating with a pure Ne buffer gas was only ~30 ns (compared to 55 ns at a PRF of 4.5 kHz) or only two round-trips through the resonator. This characteristic limits the usefulness of copper vapour lasers when required for high repetition rate, high beam quality applications. A hydrogen buffer gas additive extends the efficient PRF scaling capability of the 25 mm and 40 mm diameter copper vapour lasers to 17 and 6 kHz respectively. The $H_2$—HCl additive increases the pulse duration by a greater amount than added $H_2$. Indeed, at a PRF of 17 kHz the pulse duration of the 25 mm diameter copper vapour laser was increased from 30 ns to ~60 ns, consistent with radiation undergoing an additional two round-trips through the gain region. The output power of the 25 mm and 40 mm diameter copper vapour lasers with included tantalum metal and $H_2$—HCl—Ne buffer gas mixture scaled linearly up to the maximum PRFs (ie. 30 and 12 kHz respectively) available with the existing laser excitation circuits.

The modified spatial characteristics also contribute to the improved PRF scaling capability of copper vapour lasers operating with $H_2$—HCl—Ne buffer gas. At low PRFs the radial intensity profile of copper vapour lasers operating with pure Ne approximates a "top-hat" structure. However, as the PRF is elevated (or the aperture scaled) the intensity profile becomes increasingly annular. At PRFs>20 kHz the 25 mm diameter copper vapour laser output is visibly restricted to a ring near the tube wall. At PRFs of ~20 kHz the intensity profile of the 25 mm diameter copper vapour laser operating with $H_2$—Ne buffer gases is still relatively annular. By comparison, the same copper vapour laser operating with $H_2$—HCl added to the neon buffer gas has an axially peaked intensity profile at PRFs up to and beyond 20 kHz.

Example 6

Operational characteristics of a copper vapour laser of the invention, including tantalum pentachloride Enhanced performance of the 40 mm diameter laser described in Example 2 has also been observed using metal halide as the sole source of halogen. The laser yielded about 75 W of output power when operated with a neon buffer gas containing 2% by volume of hydrogen, without preconditioning, but with a small amount of $TaCl_5$ powder placed in a tray underneath the cathode, using either copper or stainless steel electrodes. Similar increases in output power were also observed when the halogen source comprised a piece of insulator impregnated with trace amounts of $TaCl_5$ powder or a section of glass matting impregnated with trace amounts of $TaCl_5$. The output power of the laser increased still further to 92 W when the laser was operated under these same conditions but with electrodes manufactured from tantalum.

It will be seen that output powers achievable by a metal vapour laser of the present invention represent a substantial increase over those achievable by conventional metal vapour lasers, without sacrifice in beam quality or other desirable laser characteristics.

What is claimed is:

1. An elemental metal vapour laser comprising a discharge tube having a buffer gas therein and operating at a high temperature such that the vapour pressure of said elemental metal is set by thermal evaporation of said metal and is sufficiently high to permit laser light to be produced by said laser at said high temperature, said buffer gas including a laser output power enhancing substance in an amount sufficient to substantially increase the power output of said laser, wherein said laser output power enhancing substance is a species comprising one or more atoms selected from fluorine, chlorine, bromine and iodine.

2. An elemental metal vapour laser comprising a discharge tube having a buffer gas therein, said buffer gas including a laser output power enhancing substance in an amount sufficient to substantially increase the power output of said laser, and means operatively associated with said discharge tube to add to said buffer gas an additive capable of controlling the concentration of said laser output power enhancing substance in said buffer gas.

3. An elemental metal vapour laser according to claim 1 or claim 2, wherein said laser output power enhancing substance is selected from the group consisting of a mixture of hydrogen and fluorine, a mixture of hydrogen and chlorine, a mixture of hydrogen and bromine, a mixture of hydrogen and iodine, HF, HCl, HBr and HI.

4. An elemental metal vapour laser according to claim 2, wherein said additive is selected from the group consisting of $H_2$, $D_2$, $T_2$, HD, HT, DT, $H_2O$ and $D_2O$.

5. An elemental metal vapour laser according to claim 4, wherein said additive is $H_2$ or $H_2O$ and said laser output power enhancing substance is selected from the group consisting of chlorine, bormine, HCl and HBr.

6. An elemental metal vapour laser according to claim 5, wherein said additive is $H_2$ and said laser output power enhancing substance is HCl.

7. An elemental metal vapour laser according to claim 1 or claim 2, wherein said laser output power enhancing substance is derived under operating conditions of said laser from a metal halide included in said laser.

8. An elemental metal vapour laser according to claim 7, wherein said metal halide is selected from the group consisting of $CuF_2$, $CuCl_2$, $CuCl$, $CuBr_2$, $CuBr$, $CuI$, $AuCl_3$, $FeCl_3$, $HgBr_2$, $HgCl_2$, $HgF_2$, $NbBr_5$, $NbF_5$, $NbCl_5$, $OsF_5$, $TiCl_4$, $TiCl_3$, $TiBr_4$, $ZrCl_4$, $ZrBr_4$, $MoF_5$, $MoCl_5$, $NiCl_2$, $CoCl_2$, $WBr_5$, $WCl_5$, $WCl_6$, $AlCl_3$, $ReCl_5$, $ReCl_6$, $ReBr_4$, $PbBr_2$, $PbCl_2$, $TaCl_5$, $TaF_5$, $TaBr_5$, $TaI_5$, $SnBr_4$, $SnCl_2$, $SnCl_4$, $SnF_2$, $SnF_4$, $VCl_4$, $VCl_3$, $VCl_2$, $ZnBr_2$, $ZnBr_4$ and mixtures of two or more thereof.

9. An elemental metal vapour laser according to claim 8, wherein said metal halide is a metal chloride.

10. An elemental metal vapour laser according to claim 9, wherein said metal halide is $TaCl_5$ and/or $ZrCl_4$.

11. An elemental metal vapour laser according to claim 5 which is a copper vapour laser, wherein said high temperature is from 1400–1700° C.

12. An elemental metal vapour laser according to claim 10 which is a copper vapour laser, wherein said high temperature is from 1400–1700° C.

13. An elemental metal vapour laser according to claim 7, wherein said metal halide is generated in said discharge tube by reaction of a metal and a halogen-containing reagent.

14. An elemental metal vapour laser according to claim 13, wherein said metal halide is generated in said discharge tube by reaction of copper and a halogen-containing reagent.

15. An elemental metal vapour laser according to claim 13, wherein said halogen-containing reagent is a solid halogen-containing reagent.

16. An elemental metal vapour laser comprising a discharge tube and capable of operating at high temperature, said laser comprising a quantity of a first metal capable of providing a sufficient metal vapour pressure at said high temperature to permit laser light to be produced by said laser at said high temperature wherein said high temperature is such that said metal vapour pressure is set by thermal evaporation of said metal, characterised in that said laser further comprises a quantity of a second metal or a salt thereof, said second metal being different from said first metal, said second metal or salt being capable of reacting with a gaseous halogen-containing reagent to produce a halide of said second metal, wherein a species derived from said halide of said second metal under an operating condition of said laser enhances the output power of said laser.

17. An elemental metal vapour laser according to claim 16, wherein said second metal is selected from the group consisting of tantalum, zirconium, palladium, nickel, niobium, platinum, copper, aluminum, titanium, molybdenum, tungsten, lead, rhenium and tin.

18. An elemental metal vapour laser according to claim 16, wherein said second metal is tantalum or zirconium.

19. An elemental metal vapour laser according to claim 16, wherein said gaseous halogen-containing reagent comprises a halogen or a hydrogen halide.

20. An elemental metal vapour laser according to claim 19, wherein said gaseous halogen-containing reagent is selected from the group consisting of HCl, HBr and mixtures thereof.

21. An elemental metal vapour laser according to claim 16, wherein said second metal is present in intimate mixture with a solid halogen-containing reagent capable of reacting with said second metal under operating conditions of said laser to produce said metal halide.

22. An elemental metal vapour laser according to claim 16, further comprising a quantity of a substance selected from the group consisting of a third metal and a metal halide, said third metal being different from said first and second metals.

23. An elemental metal vapour laser according to claim 2, wherein said third metal is selected from the group consisting of Au, Fe, Hg, Nb, Os, Ti, Zr, Mo, Ni, Co, W, Al, Re, Pb, Ta, Sn, V and Zn.

24. An elemental metal vapour laser according to any one of claims 16–23, said laser containing a buffer gas comprising an additive which is hydrogen.

25. An elemental metal vapour laser according to any one of claims 16–23, said laser further comprising a quantity of a metal hydride capable of dissociating to produce hydrogen atoms at an operating temperature of said laser.

26. An elemental metal vapour laser according to any one of claims 16–23, wherein said first metal is copper.

27. An elemental copper vapour laser, further comprising a quantity of tantalum metal or zirconium metal, said laser including a buffer gas which is a mixture of HCl or HBr with an inert gas and hydrogen.

28. A process for operating an elemental metal vapour laser comprising a discharge tube having a buffer gas therein and operating at a temperature such that the vapour pressure of said elemental metal is set by thermal evaporation of said metal, wherein said metal vapour pressure is sufficiently high to permit laser light to be produced by said laser at said temperature, comprising premixing a laser output power enhancing substance with said buffer gas and/or generating a laser output power enhancing substance in said discharge tube, said laser output power enhancing substance being present in said discharge tube at an operating condition of said laser in an amount sufficient to substantially increase the power output of said laser, wherein said laser output power enhancing substance is a species comprising one or more atoms selected from fluorine, chlorine, bromine and iodine.

29. A process for operating an elemental metal vapour laser comprising a discharge tube having a buffer gas therein, said buffer gas including a laser output power enhancing substance in an amount sufficient to substantially increase the power output of said laser; comprising the step of adjusting the concentration of said laser output power enhancing substance by adding to said buffer gas an additive capable of controlling the concentration of said laser output power enhancing substance in said buffer gas.

30. A process according to claim 28 or claim 29, wherein said laser output power enhancing substance is selected from the group consisting of a mixture of hydrogen and fluorine, a mixture of hydrogen and chlorine, a mixture of hydrogen and bromine, a mixture of hydrogen and iodine, HF, HCl, HBr and HI.

31. A process according to claim 29, wherein said additive is selected from the group consisting of $H_2$, $D_2$, $T_2$, HD, HT, DT, $H_2O$ and $D_2O$.

32. A process according to claim 31, wherein said additive is $H_2$ or $H_2O$ and said laser output power enhancing substance is selected from the group consisting of chlorine, boromine, HCl and HBr.

33. A process according to claim 32, wherein said additive is $H_2$ and said laser output power enhancing substance is HCl.

34. A process according to claim 28 or claim 31, wherein said laser output power enhancing substance is generated in said discharge tube from a metal halide included in said laser.

35. A process according to claim 34, wherein said metal halide is selected from the group consisting of $CuF_2$, $CuCl_2$, CuCl, $CuBr_2$, CuBr, CuI, $AuCl_3$, $FeCl_3$, $HgBr_2$, $HgCl_2$, $HgF_2$, $NbBr_5$, $NbF_5$, $NbCl_5$, $OsF_5$, $TiCl_4$, $TiCl_3$, $TiBr_4$, $ZrCl_4$, $ZrBr_4$, $MoF_5$, $MoCl_5$, $NiCl_2$, $CoCl_2$, $WBr_5$, $WCl_5$, $WCl_6$, $AlCl_3$, $ReCl_5$, $ReCl_6$, $ReBr_4$, $PbBr_2$, $PbCl_2$, $TaCl_5$, $TaF_5$, $TaBr_5$, $TaI_5$, $SnBr_4$, $SnCl_2$, $SnCl_4$, $SnF_2$, $SnF_4$, $VCl_4$, $VCl_3$, $VCl_2$, $ZnBr_2$, $ZnBr_4$ and mixtures of two or more thereof.

36. A process according to claim 35, wherein said metal halide is a metal chloride.

37. A process according to claim 36, wherein said metal halide is $TaCl_5$ and/or $ZrCl_4$.

38. A process according to claim 29 wherein said laser is a copper vapour laser and said temperature is from 1400–1700° C.

39. A process according to claim 37 wherein said laser is a copper vapour laser and said temperature is from 1400–1700° C.

40. A process according to claim 34, wherein said metal halide is generated in said discharge tube by reaction of a metal and a halogen-containing reagent.

41. A process according to claim 40, wherein said halogen-containing reagent is a solid halogen-containing reagent.

42. A process according to claim 29, wherein the concentration of said additive is fixed and the concentration of said laser output power enhancing substance is varied by varying a concentration of a precursor of said laser output power enhancing substance.

43. A process according to claim 28 or 29, wherein said laser output power enhancing substance is generated in said discharge tube, further comprising the steps of:

pre-conditioning said laser by passing a gaseous halogen-containing reagent through said discharge tube at a temperature lower than said high temperature for a time and under conditions sufficient for said laser output power enhancing substance or a precursor of said laser output power enhancing substance to be formed, or for said laser output power enhancing substance to be adsorbed or adsorbed on a surface of said discharge tube, said reagent being capable of reacting with or being adsorbed or absorbed by said surface of said discharge tube;

discontinuing passage of said gaseous halogen-containing reagent; and raising the temperature of said discharge tube to said high temperature.

44. A process for operating an elemental metal vapour laser comprising a discharge tube having a buffer gas therein and operating at high temperature such that the vapour pressure of said elemental metal is set by thermal evaporation of said metal, the process comprising:

providing in said laser a quantity of a first metal and a quantity of a second metal or a salt thereof, said first metal being capable of providing a sufficient metal vapour pressure at said high temperature to permit laser light to be produced by said laser at said high temperature, said second metal being different from said first metal, and said second metal or salt being capable of reacting with a gaseous halogen-containing reagent to produce a halide of said second metal wherein a species derived from said halide of said second metal under an operating condition of said laser enhances the output power of said laser;

pre-conditioning said laser by contacting a gaseous halogen-containing reagent with said second metal in said discharge tube at a temperature lower than said high temperature for a time and under conditions sufficient for a halide of said second metal to be formed;

raising the temperature of said discharge tube to said high temperature;

passing a buffer gas through said discharge tube; and generating a discharge in said discharge tube and producing laser light from said laser.

45. A process according to claim 44, wherein said second metal is selected from the group consisting of tantalum, zirconium, palladium, nickel, niobium, platinum, copper, aluminium, titanium, molybdenum, tungsten, lead, rhenium and tin.

46. A process according to claim 45, wherein said second metal is tantalum or zirconium.

47. A process according to claim 44, further comprising providing in said laser a quantity of a substance selected from the group consisting of a third metal and a metal halide, said third metal being different from said first and second metals.

48. A process according to claim 44, wherein said gaseous halogen-containing reagent comprises a halogen or a hydrogen halide.

49. A process according to claim 48, wherein said gaseous halogen-containing reagent is selected from the group consisting of HCl, HBr and mixtures thereof.

50. A process according to any one of claims 44–47, wherein said buffer gas comprises hydrogen.

51. A process according to claim 50, wherein said buffer gas further comprises a halogen or a hydrogen halide.

52. A process according to any one of claims 44–47, wherein said first metal is copper.

* * * * *